US012756260B2

(12) United States Patent
Matsuoka et al.

(10) Patent No.: US 12,756,260 B2
(45) Date of Patent: Oct. 6, 2026

(54) MOTOR, FAN, AND VENTILATION FAN

(71) Applicant: Mitsubishi Electric Corporation, Tokyo (JP)

(72) Inventors: Atsushi Matsuoka, Tokyo (JP); Junji Okada, Tokyo (JP); Takuya Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 187 days.

(21) Appl. No.: 18/690,790

(22) PCT Filed: Sep. 28, 2021

(86) PCT No.: PCT/JP2021/035628
§ 371 (c)(1),
(2) Date: Mar. 11, 2024

(87) PCT Pub. No.: WO2023/053199
PCT Pub. Date: Apr. 6, 2023

(65) Prior Publication Data

US 2024/0405630 A1 Dec. 5, 2024

(51) Int. Cl.
*H02K 1/02* (2006.01)
*H02K 5/16* (2006.01)
(Continued)

(52) U.S. Cl.
CPC ............... *H02K 5/161* (2013.01); *H02K 1/02* (2013.01); *H02K 7/14* (2013.01); *H02K 11/40* (2016.01)

(58) Field of Classification Search
CPC .......... H02K 5/161; H02K 11/40; H02K 1/02; H02K 7/14
See application file for complete search history.

(56) References Cited

U.S. PATENT DOCUMENTS

2021/0359560 A1* 11/2021 Kim ....................... H02K 1/278
2022/0239171 A1 7/2022 Watanabe et al.

FOREIGN PATENT DOCUMENTS

CN 103973043 B 2/2018
JP H10014159 A 1/1998
(Continued)

OTHER PUBLICATIONS

Office Action dated Jun. 4, 2024 issued in corresponding Japanese Patent Application No. 2023-550785 (and English machine translation).

(Continued)

*Primary Examiner* — Terrance L Kenerly
(74) *Attorney, Agent, or Firm* — Posz Law Group, PLC

(57) ABSTRACT

A motor includes a rotary shaft, a rotor fixed to the rotary shaft, a stator including a stator core surrounding the rotor in a radial direction about a center axis of the rotary shaft, and a coil wound on the stator core, a bearing supporting the rotary shaft, and a conducting member electrically connecting the stator core to an outer ring of the bearing. The rotor includes a facing portion formed of a bond magnet and facing the stator core in the radial direction, and an insulating joining portion joining the facing portion and the rotary shaft. A length L1 of the facing portion in an axial direction of the rotary shaft is equal to or shorter than a length L2 of the stator core in the axial direction.

17 Claims, 19 Drawing Sheets

(51) Int. Cl.
*H02K 7/14* (2006.01)
*H02K 11/40* (2016.01)

(56) References Cited

FOREIGN PATENT DOCUMENTS

| | | | |
|---|---|---|---|
| JP | 2006-019573 | A | 1/2006 |
| JP | 2011-030423 | A | 2/2011 |
| JP | 2012-005307 | A | 1/2012 |
| JP | 5076311 | B2 | 11/2012 |
| JP | 2015-106944 | A | 6/2015 |
| WO | 2018179832 | A1 | 10/2018 |
| WO | 2020/261420 | A1 | 12/2020 |

OTHER PUBLICATIONS

International Search Report of the International Searching Authority dated Dec. 28, 2021 for the corresponding International Application No. PCT/JP2021/035628 (and English translation).

* cited by examiner

MOTOR, FAN, AND VENTILATION FAN

CROSS-REFERENCE TO RELATED APPLICATION

This application is a U.S. national stage application of PCT/JP2021/035628 filed Sep. 28, 2021, the contents of which are incorporated herein by reference.

TECHNICAL FIELD

The present disclosure relates to a motor, a fan, and a ventilation fan.

BACKGROUND

Generally, in a motor in which a stator is held by a metal housing, the housing is grounded. A rotary shaft of the motor is supported by a bearing. An inner ring of the bearing is fixed to the rotary shaft, and an outer ring of the bearing is fixed to the housing (see, for example, Patent Reference 1).

PATENT REFERENCE

Patent Reference 1: Japanese Patent Application Publication No. 2012-5307 (see paragraph 0018)

In the inner ring and the outer ring of the bearing, only the outer ring is grounded via the housing, and thus, a potential difference may occur between the inner ring and the outer ring. When the potential difference increases, electric discharge occurs between the inner ring and the outer ring, and accordingly, unevenness occurs on raceway surfaces that are in contact with rolling elements. This phenomenon is referred to as electrolytic corrosion. When electrolytic corrosion occurs, vibration and noise arise when the rolling elements travel on the raceway surfaces.

SUMMARY

The present disclosure is made to solve the above-described problem, and an object of the present disclosure is to suppress occurrence of electrolytic corrosion.

A motor according to the present disclosure includes a rotary shaft, a rotor fixed to the rotary shaft, a stator including a stator core surrounding the rotor in a radial direction about a center axis of the rotary shaft, and a coil wound on the stator core, a bearing having an inner ring and an outer ring, the inner ring being in contact with the rotary shaft, and a conducting member electrically connecting the stator core to the outer ring and being grounded. The rotor includes a facing portion formed of a bond magnet and facing the stator core in the radial direction, and an insulating joining portion joining the facing portion and the rotary shaft. A length L1 of the facing portion in an axial direction of the rotary shaft is equal to or shorter than a length L2 of the stator core in the axial direction.

According to the present disclosure, since the length L1 of the facing portion formed of the bond magnet in the axial direction is equal to or shorter than the length L2 of the stator core in the axial direction, a portion with a high permittivity located between the coil end of the coil and the rotary shaft can be reduced. As a result, the potential difference between the inner ring and the outer ring of the bearing decreases, and occurrence of electrolytic corrosion can be suppressed.

DETAILED DESCRIPTION

First Embodiment (Overall Configuration of Motor)

Figure 1:
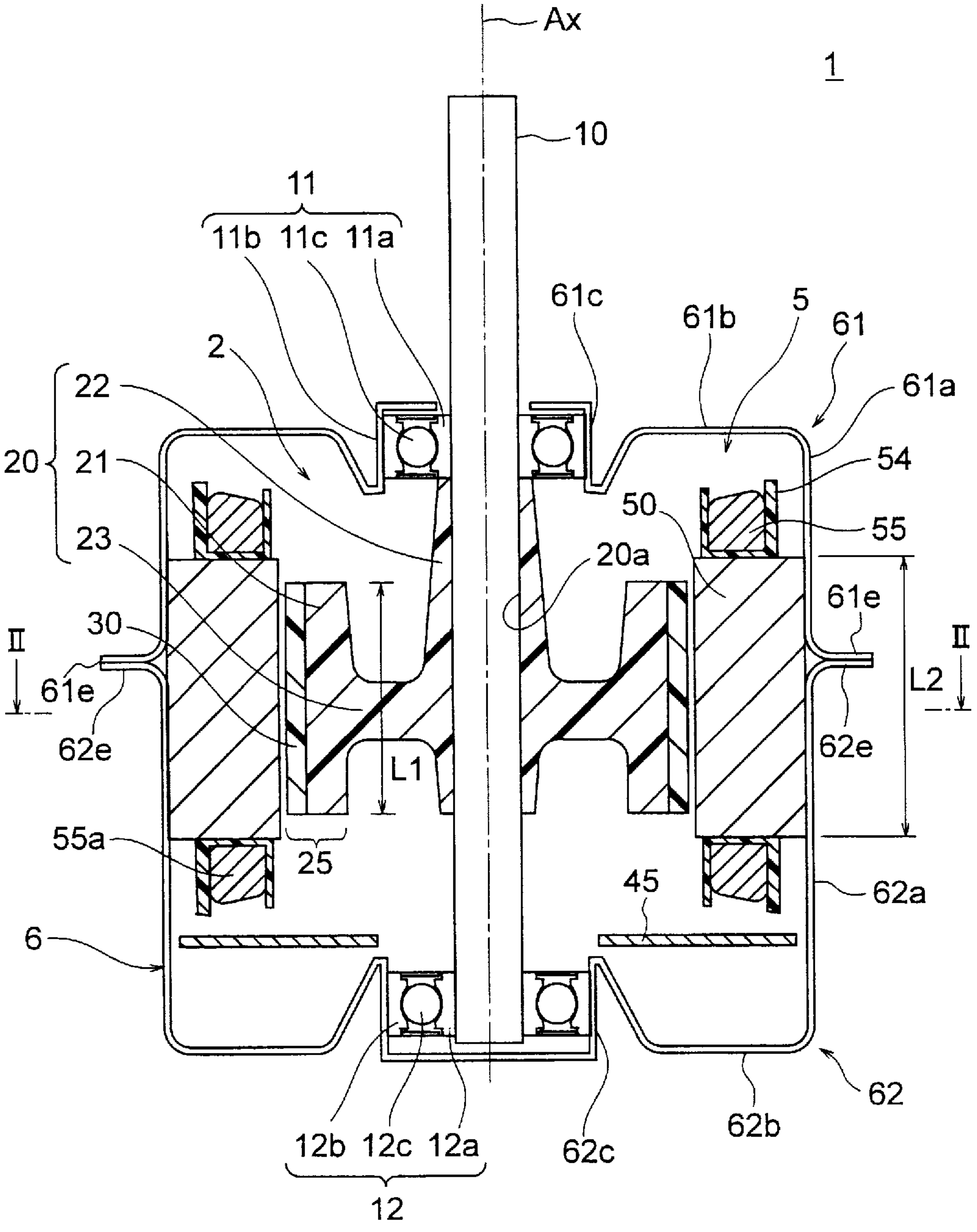
FIG. 1 is a longitudinal sectional view illustrating a motor of a first embodiment.
Figure 20:
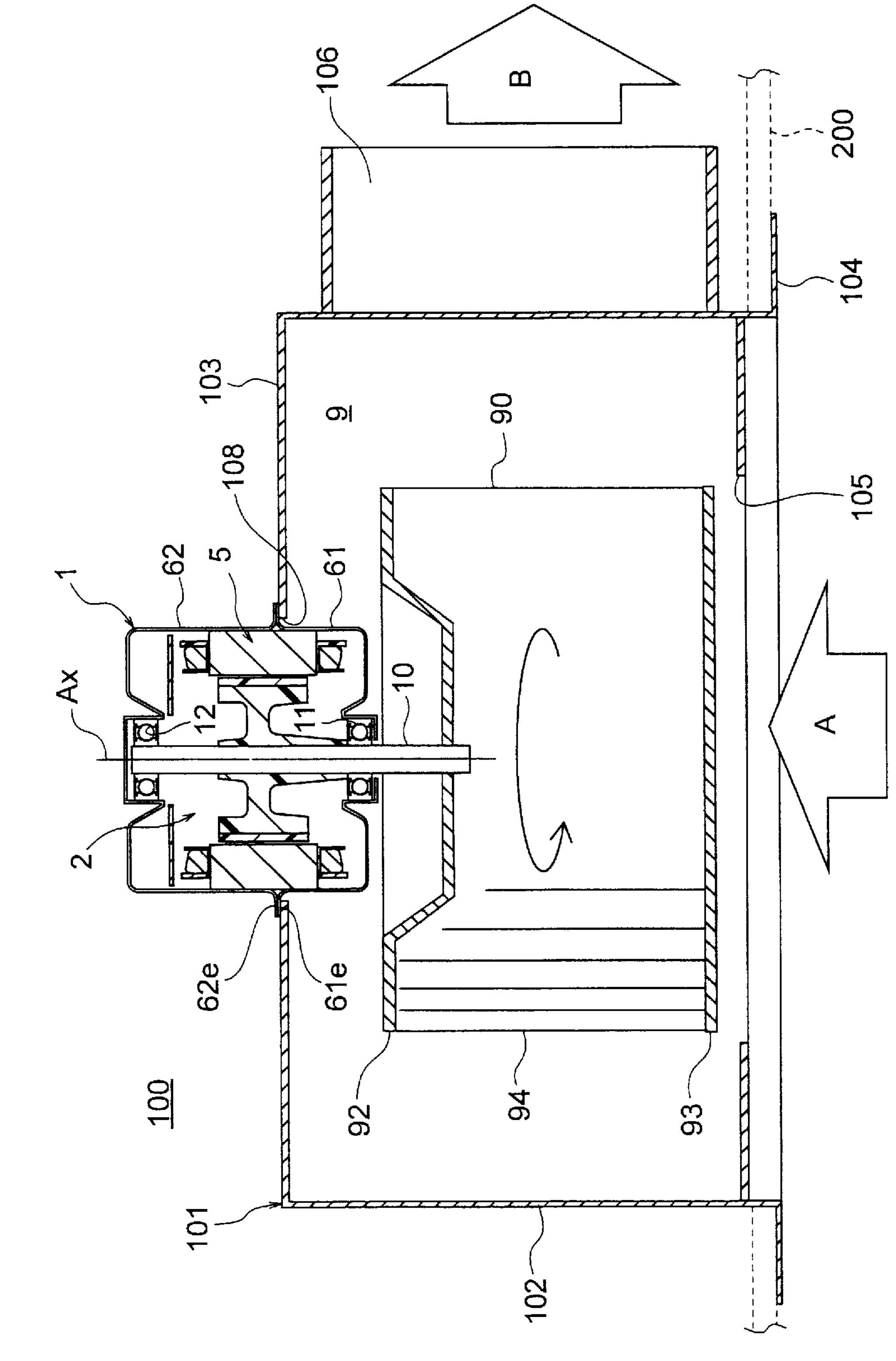
FIG. 20 is a longitudinal sectional view illustrating a ventilation fan of a fourth embodiment.

A motor according to a first embodiment will be described. FIG. 1 is a longitudinal sectional view illustrating a motor 1 according to the first embodiment. The motor 1 is a synchronous motor and used for, for example, a fan 9 of a ventilation fan (FIG. 20).

The motor 1 includes a rotary shaft 10, a rotor 2 fixed to the rotary shaft 10, a stator 5 surrounding the rotor 2, a housing 6 housing the stator 5, and bearings 11 and 12 supporting the rotary shaft 10. A center axis Ax of the rotary shaft 10 defines a rotation center of the rotor 2.

Hereinafter, a direction of the center axis Ax is referred to as an "axial direction." A radial direction about the center axis Ax is referred to as a "radial direction." A circumferential direction about the center axis Ax is referred to as a "circumferential direction." A sectional view in a plane parallel to the center axis Ax is referred to as a longitudinal sectional view, and a sectional view in a plane orthogonal to the center axis Ax is referred to as a transverse sectional view.

The housing 6 includes a first frame 61 and a second frame 62 in the axial direction. Each of the first frame 61 and the second frame 62 is formed of a metal, more specifically a steel sheet.

The first frame 61 includes a peripheral wall portion 61*a* which is cylindrical about the center axis Ax, and a bottom portion 61*b* formed at an end of the peripheral wall portion 61*a* in the axial direction. An annular flange portion 61*e* is formed at the other end of the peripheral wall portion 61*a* in the axial direction.

The second frame 62 includes a peripheral wall portion 62*a* which is cylindrical about the center axis Ax, and a bottom portion 62*b* formed at an end of the peripheral wall portion 62*a* in the axial direction. An annular flange portion 62*e* is formed at the other end of the peripheral wall portion 62*a* in the axial direction.

The first frame 61 and the second frame 62 are combined in such a manner that the flange portions 61*e* and 62*e* abut against each other. The flange portions 61*e* and 62*e* of the first frame 61 and the second frame 62 are fixed to each other by bonding, fastening, or welding. The housing 6 constituted by the first frame 61 and the second frame 62 is grounded.

The bottom portion 61*b* of the first frame 61 includes a bearing holding portion 61*c* that holds the bearing 11. The bearing holding portion 61*c* is formed by, for example, deforming a center portion of the bottom portion 61*b* into a cylindrical shape. The bearing 11 is fitted in the bearing holding portion 61*c*.

The bottom portion 62*b* of the second frame 62 includes a bearing holding portion 62*c* that holds the bearing 12. The bearing holding portion 62*c* is formed by, for example, deforming a center portion of the bottom portion 62*b* into a cylindrical shape. The bearing 12 is fitted in the bearing holding portion 62*c*.

The bearings 11 and 12 rotatably support the rotary shaft 10. The bearing 11 is positioned in the axial direction by contact with an inner cylinder portion 22 of a ferrite bond magnet 20 of the rotor 2 described later. The bearing 12 is positioned in the axial direction by an e-ring, which is fixed to the rotary shaft 10, or the like.

The rotary shaft 10 projects outward through an opening formed in the bottom portion 61*b* of the first frame 61. An impeller 90 (FIG. 20), for example, is mounted to the distal end of the rotary shaft 10. Thus, the projecting side of the rotary shaft 10 is referred to as a load side, and the opposite side is referred to as a counter-load side.

(Configuration of Stator)

Figure 2:
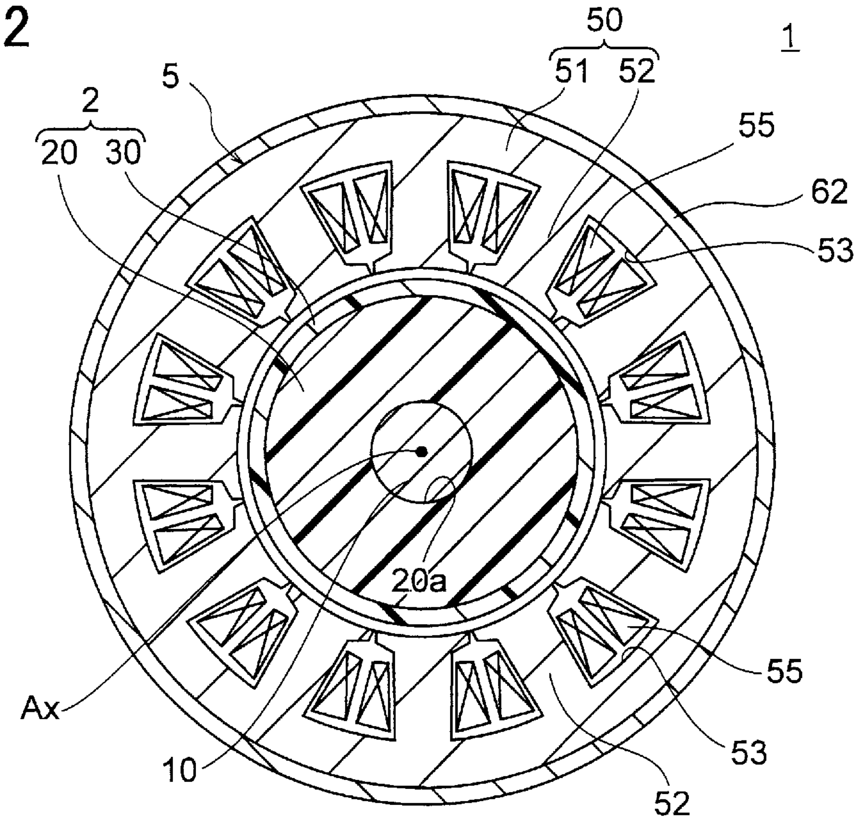
FIG. 2 is a transverse sectional view of the motor taken along line II-II in FIG. 1.

FIG. 2 is a sectional view of the motor 1 taken along line II-II in FIG. 1. As illustrated in FIG. 2, the stator 5 includes a stator core 50 and a coil 55 wound on the stator core 50. The stator core 50 includes a yoke 51 which is annular about the center axis Ax, and a plurality of teeth 52 extending inward in the radial direction from the yoke 51. An outer peripheral surface of the yoke 51 is fitted in an inner peripheral surface of the housing 6.

The teeth 52 are arranged at equal intervals in the circumferential direction. Distal ends of the teeth 52 face the outer peripheral surface of the rotor 2 via an air gap. The number of the teeth 52 is 12 in this example, but is not limited to 12. A slot 53 is formed between adjacent ones of the teeth 52.

The coil 55 is constituted by, for example, a magnet wire. The coil 55 is wound around the teeth 52 via an insulating portion 54 (FIG. 1), and is housed in the slots 53. A portion of the coil 55 which is not housed in the slots 53 and extends on an end surface of the stator core 50 in the axial direction is referred to as a coil end 55*a* (FIG. 1).

The insulating portion 54 illustrated in FIG. 1 is formed of a resin such as polyphenylene sulfide (PPS), polyethylene terephthalate (PET), or polybutylene terephthalate (PBT). The insulating portion 54 is not shown in FIG. 2.

A circuit board 45 is disposed on the counter-load side of the stator 5. The circuit board 45 is supported by not shown pins fixed to the insulating portion 54. A driving circuit for driving the motor 1 to rotate, such as an inverter, is mounted on the circuit board 45. The circuit board 45 may be disposed outside the housing 6.

(Configuration of Rotor)

Figure 3:
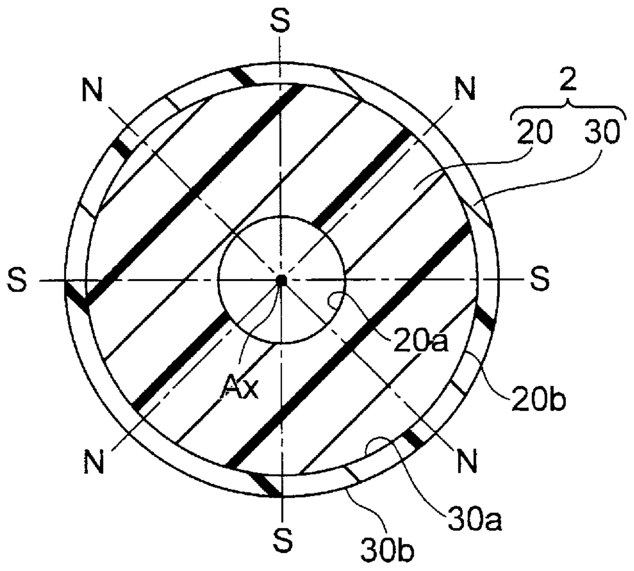
FIG. 3 is a transverse sectional view illustrating a rotor of the first embodiment.

FIG. 3 is a sectional view illustrating the rotor 2. The rotor 2 includes the ferrite bond magnet 20 as a first permanent magnet fixed to the rotary shaft 10 (FIG. 2), and a rare-earth bond magnet 30 as a second permanent magnet disposed at an outer periphery of the ferrite bond magnet 20. The ferrite bond magnet 20 and the rare-earth bond magnet 30 are integrally molded with the rotary shaft 10.

The ferrite bond magnet 20 includes magnetic powder of a ferrite magnet and a resin. The resin included in the ferrite bond magnet 20 is, for example, polyamide (nylon) but may be poly phenylene sulfide (PPS) or the like. The magnetic powder of the ferrite magnet is insulative, and the resin surrounding the magnetic powder is also insulative. Thus, the ferrite bond magnet 20 is insulative as a whole.

The ferrite bond magnet 20 is oriented to have four south poles and four north poles arranged alternately in the circumferential direction. The number of poles of the ferrite bond magnet 20 is eight. The number of poles of the ferrite bond magnet 20 is not limited to eight and only needs to be two or more.

The rare-earth bond magnet 30 includes magnetic powder of a rare-earth magnet and a resin. The rare-earth magnet is, for example, a neodymium magnet containing neodymium (Nd), iron (Fe), and boron (B), or a samarium-iron-nitrogen magnet containing samarium (Sm), iron (Fe), and nitrogen (N).

The resin included in the rare-earth bond magnet is, for example, polyamide (nylon) but may be PPS or the like. The magnetic powder of the rare-earth magnet is conductive, but the resin surrounding the magnetic powder is insulative. Thus, the rare-earth bond magnet 30 is insulative as a whole.

In a manner similar to the ferrite bond magnet 20, the rare-earth bond magnet 30 is oriented to have four south poles and four north poles arranged alternately in the circumferential direction. That is, the number of poles of the rare-earth bond magnet 30 is eight. The number of poles of the rare-earth bond magnet 30 is not limited to eight, and only needs to be equal to the number of poles of the ferrite bond magnet 20.

The ferrite bond magnet 20 and the rare-earth bond magnet 30 have different magnetic forces. Specifically, the magnetic force of the rare-earth bond magnet 30 is higher than the magnetic force of the ferrite bond magnet 20.

Figure 4:
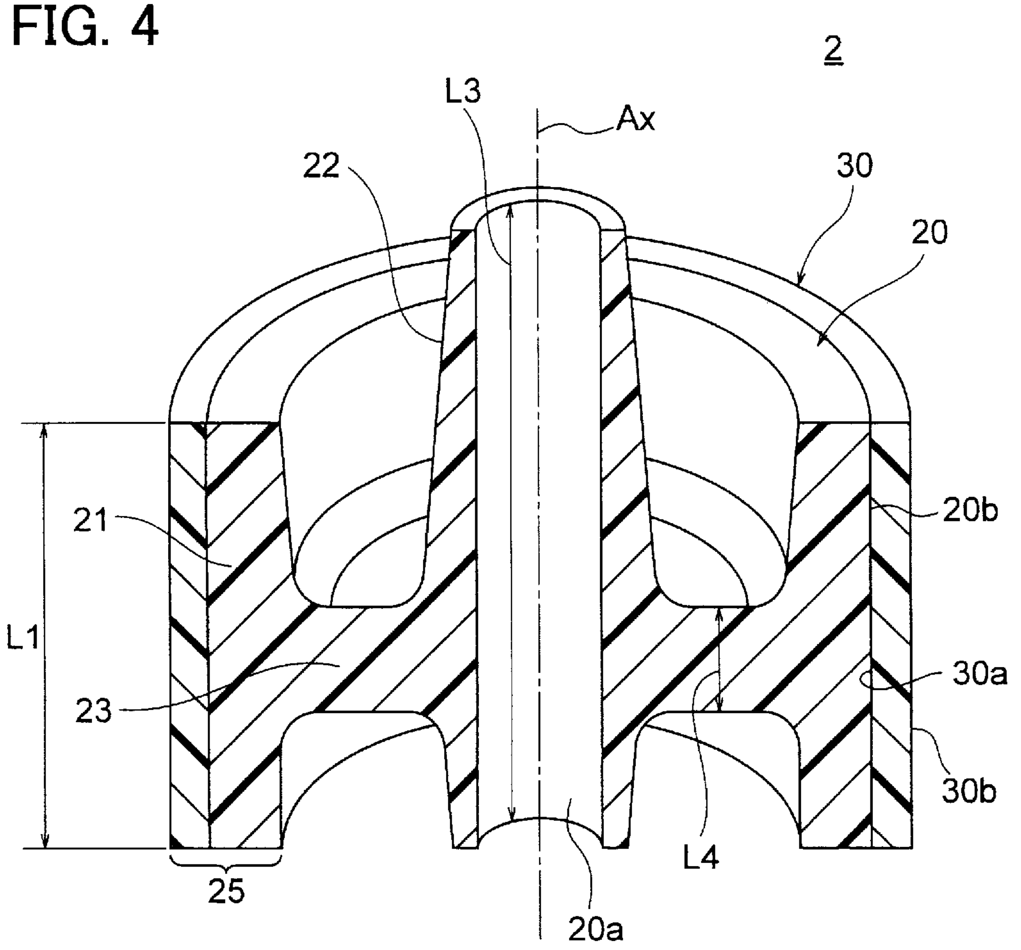
FIG. 4 is a partially cutaway perspective view illustrating the rotor of the first embodiment.

FIG. 4 is a partially cutaway perspective view illustrating the rotor 2. The ferrite bond magnet 20 includes an annular portion 21 which is annular about the center axis Ax, an inner cylinder portion 22 fixed to the rotary shaft 10 (FIG. 1), and a connecting portion 23 connecting the annular portion 21 and the inner cylinder portion 22.

The annular portion 21 has a length L1 in the axial direction. The inner cylinder portion 22 has a length L3 in the axial direction. The connecting portion 23 has a length L4 in the axial direction. In the example illustrated in FIG. 4, the lengths L1 and L3 satisfy a relationship of L1<L3, and the inner cylinder portion 22 projects from the annular portion 21 to one side (toward the bearing 11 in this example) in the axial direction to thereby position the bearing 11 in the axial direction.

In the case of positioning the bearing 11 with the e-ring or the like, L1 and L3 may satisfy L1≥L3 so that the inner cylinder portion 22 does not project from the annular portion 21. On the other hand, the lengths L1 and L4 satisfy a relationship of L1>L4, and the connecting portion 23 is housed inside the annular portion 21 in the axial direction.

The rare-earth bond magnet 30 is fixed to an outer peripheral surface 20*b* of the ferrite bond magnet 20, that is, an outer peripheral surface of the annular portion 21. The rotary shaft 10 is fixed to an inner peripheral surface 20*a* of the ferrite bond magnet 20, that is, an inner peripheral surface of the inner cylinder portion 22.

The rare-earth bond magnet 30 has an annular shape as a whole. An inner peripheral surface 30*a* of the rare-earth bond magnet 30 is fixed to the outer peripheral surface 20*b* of the ferrite bond magnet 20. An outer peripheral surface 30*b* of the rare-earth bond magnet 30 faces the teeth 52 (FIG. 2) of the stator 5 via the air gap.

The length L1 of the rare-earth bond magnet 30 in the axial direction is equal to the length L1 of a facing portion 25 of the ferrite bond magnet 20 in the axial direction.

The annular portion 21 of the ferrite bond magnet 20 and the rare-earth bond magnet 30 will be collectively referred to as the facing portion 25. The facing portion 25 faces the stator core 50 via the air gap in the radial direction. The length of the facing portion 25 in the axial direction is the length L1 described above.

Of the annular portion 21 and the rare-earth bond magnet 30 constituting the facing portion 25, the annular portion 21 will be also referred to as a first magnet portion, and the rare-earth bond magnet 30 is also referred to as a second magnet portion. The inner cylinder portion 22 and the connecting portion 23 of the ferrite bond magnet 20 constitute a joining portion located between the facing portion 25 and the rotary shaft 10.

The ferrite bond magnet 20 and the rare-earth bond magnet 30 are integrally molded with the rotary shaft 10 by insertion molding using an injection molding machine.

Specifically, the rotary shaft 10 is inserted in a first mold, and the first mold is filled with a melted ferrite bond magnet material so that the ferrite bond magnet 20 is integrally molded with the rotary shaft 10. With application of a polar anisotropic magnetic field during the molding, the ferrite bond magnet 20 is oriented to have magnetic poles shown in FIG. 3.

Next, the rotary shaft 10 and the ferrite bond magnet 20 are placed in a second mold, and the second mold is filled with a melted rare-earth bond magnet material so that the rare-earth bond magnet 30 is molded on the outer peripheral surface 20*b* of the ferrite bond magnet 20. With application of a polar anisotropic magnetic field during the molding, the rare-earth bond magnet 30 is oriented to have magnetic poles shown in FIG. 3.

Since the rotary shaft 10, the ferrite bond magnet 20, and the rare-earth bond magnet 30 are integrally molded, these components are firmly integrated, and the manufacturing cost is reduced.

Figure 5:
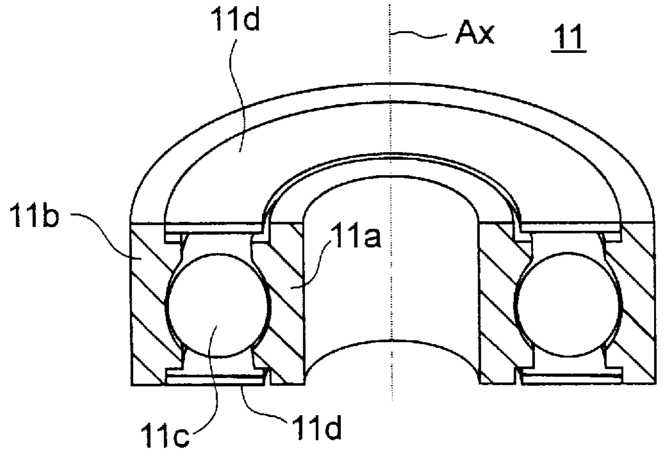
FIG. 5 is a partially cutaway perspective view illustrating a bearing of the first embodiment.

FIG. 5 is a partially cutaway perspective view illustrating the bearing 11. The bearing 11 includes an inner ring 11*a* fixed to the rotary shaft 10, an outer ring 11*b* fixed to the housing 6, and a plurality of rolling elements 11*c* disposed between the inner ring 11*a* and the outer ring 11*b*.

The rolling elements 11*c* are, for example, balls. Each of the inner ring 11*a*, the outer ring 11*b*, and the rolling elements 11*c* is made of a metal. Shielding plates 11*d* are provided at both sides of the inner ring 11*a* and the outer ring 11*b* in the axial direction.

Figure 6:
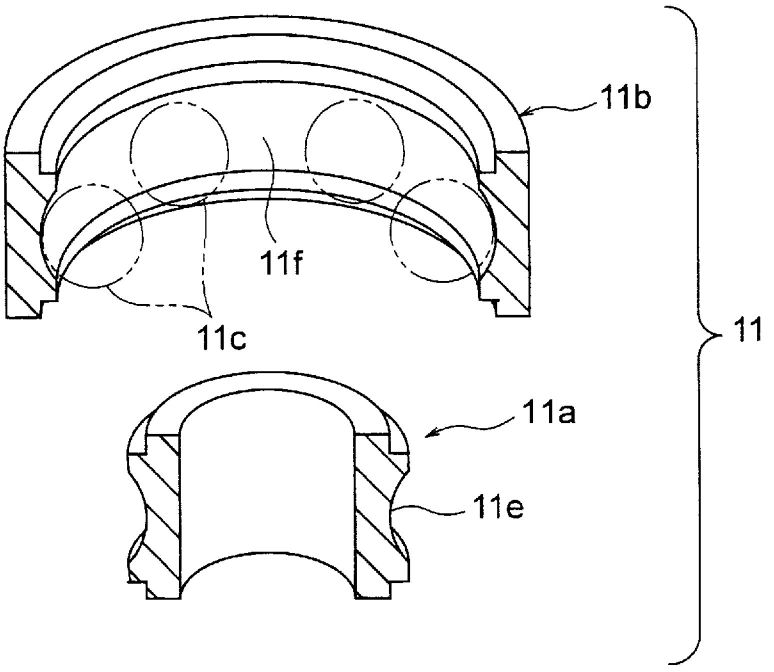
FIG. 6 is a partially cutaway perspective view illustrating an outer ring and an inner ring of the bearing of the first embodiment.

FIG. 6 is a partially cutaway perspective view illustrating the inner ring 11*a* and the outer ring 11*b* of the bearing 11. A raceway surface 11*e* for guiding the rolling elements 11*c* is formed along the outer periphery of the inner ring 11*a*. A raceway surface 11*f* for guiding the rolling elements 11*c* is formed along the inner periphery of the outer ring 11*b*.

Grease for lubrication is provided between the raceway surfaces 11*e* and 11*f* and the rolling elements 11*c*. A not-shown retainer is disposed between the inner ring 11*a* and the outer ring 11*b* to keep a constant interval between the rolling elements 11*c* in the circumferential direction.

While FIGS. 5 and 6 illustrate the configuration of the bearing 11 on the load side, the bearing 12 (FIG. 1) on the counter-load side has a configuration similar to the bearing 11.

The outer rings 11*b* and 12*b* of the bearings 11 and 12 are in contact with the housing 6, and thus the outer rings 11*b* and 12*b* are at the same potential as the stator core 50 fitted in the housing 6. The housing 6 corresponds to a conducting member that electrically connects the outer rings 11*b* and 12*b* of the bearings 11 and 12 and the stator core 50 to each other.

(Function)

Figure 7:
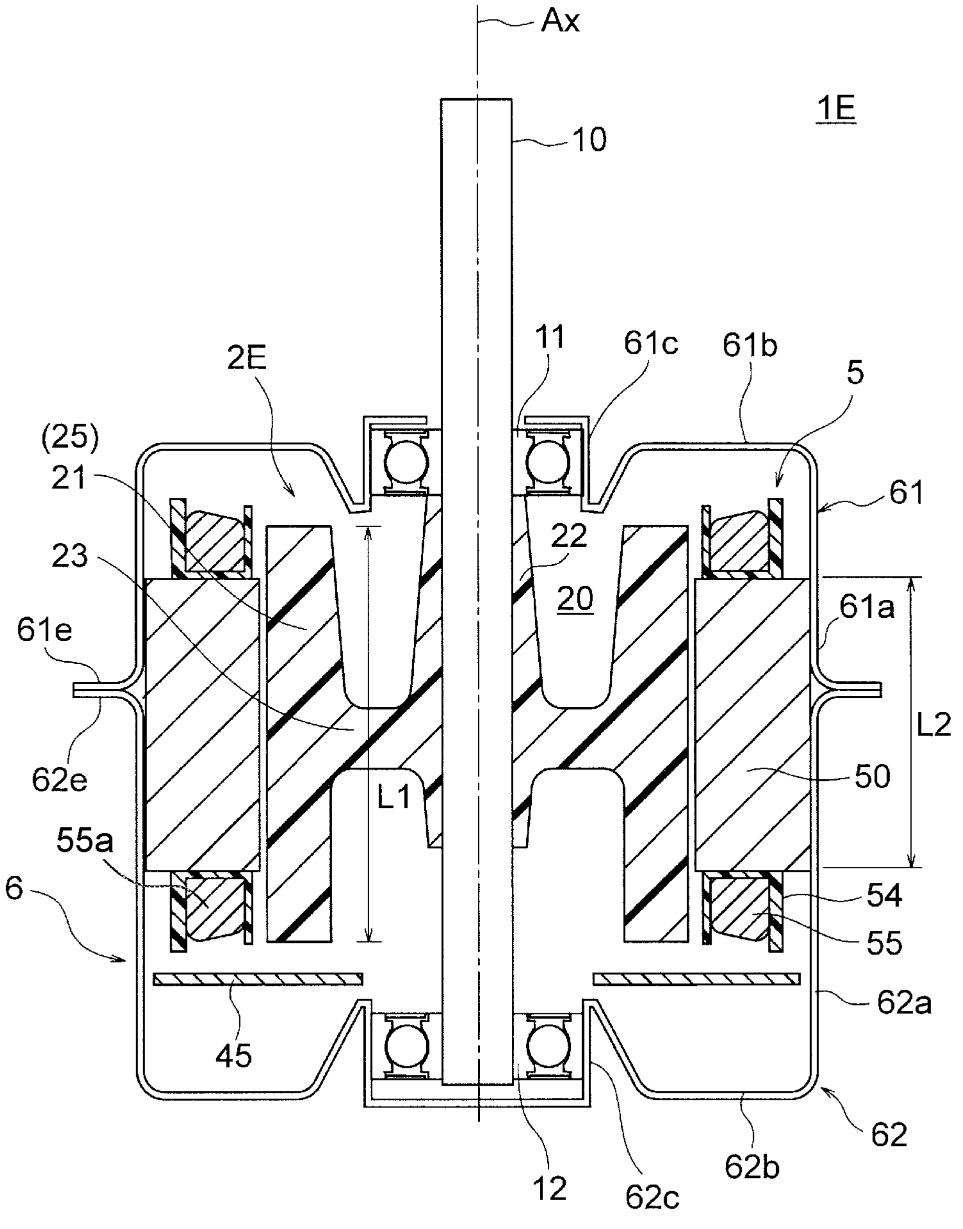
FIG. 7 is a longitudinal sectional view illustrating a motor of a first comparative example.

Next, function of the first embodiment will be described in comparison with a first comparative example. FIG. 7 is a longitudinal sectional view illustrating a motor 1E of the first comparative example. A rotor 2E of the first comparative example is entirely constituted by a ferrite bond magnet 20 and does not include a rare-earth bond magnet.

In a manner similar to the first embodiment, the ferrite bond magnet 20 includes an annular portion 21, an inner cylinder portion 22, and a connecting portion 23. The annular portion 21 of the ferrite bond magnet 20 constitutes a facing portion 25 facing a stator core 50. A length L1 of the facing portion 25 in the axial direction is longer than a length L2 of the stator core 50 in the axial direction (L1>L2).

In the first comparative example, the facing portion 25 of the rotor 2E projects from the stator core 50 to both sides in the axial direction. Thus, a coil end 55*a* of a coil 55 of the stator 5 faces the facing portion 25 of the rotor 2E in the radial direction.

As described above, the ferrite bond magnet 20 includes magnetic powder of a ferrite magnet and a resin such as polyamide. The relative permittivity of polyamide is approximately 3 to 4. The relative permittivity of the ferrite bond magnet 20, which includes the magnetic powder, is 40 to 200.

In the motor 1E of the comparative example, the annular portion 21 and the inner cylinder portion 22 of the ferrite bond magnet 20 having a high permittivity are present between the coil end 55*a* of the coil 55 and the rotary shaft 10.

As described with reference to FIGS. 5 and 6, when the rotary shaft 10 rotates, the inner ring 11*a* rotates together with the rotary shaft 10, and the rolling elements 11*c* also rotate. Thin films of grease are formed between the inner ring 11*a* and the rolling elements 11*c* and between the outer ring 11*b* and the rolling elements 11*c*. By the formation of the thin films of grease, the inner ring 11*a*, the outer ring 11*b*, and the rolling elements 11*c* are electrically insulated.

The housing 6 to which the outer ring 11*b* of the bearing 11 is fixed is grounded, whereas the rotary shaft 10 to which the inner ring 11*a* is fixed is not grounded. Due to a potential of the rotary shaft 10, a potential difference occurs between the inner ring 11*a* and the outer ring 11*b*. When the potential difference exceeds a dielectric breakdown voltage of the thin film of grease, discharge occurs between the inner ring 11*a* and the outer ring 11*b*.

A phenomenon in which energy of discharge causes unevenness on the raceway surfaces 11*e* and 11*f* of the inner ring 11*a* and the outer ring 11*b* is referred to as electrolytic corrosion. When unevenness occurs on the raceway surfaces 11*e* and 11*f*, vibration and noise occur while the rolling elements 11*c* travel on the raceway surfaces 11*e* and 11*f*. Although the foregoing description is directed to the bearing 11 on the load side, the same can be said to the bearing 12 (FIG. 1) on the counter-load side.

Since the housing 6 is grounded, the stator core 50 and the outer rings 11*b* and 12*b* in contact with the housing 6 are at the ground potential (GND). On the other hand, since electric power is supplied to the coil 55 wound around the stator core 50 via the insulating portion 54, a potential difference occurs between the coil 55 and the stator core 50, for example. Accordingly, potential distribution occurs in the internal space of the motor 1E, and a potential of the rotary shaft 10 occurs.

The potential of the rotary shaft 10 depends on electric capacity between the stator core 50 and the rotary shaft 10, electric capacity between the coil end 55*a* and the rotary shaft 10, and electric capacity between the inner rings 11*a* and 12*a* and the outer rings 11*b* and 12*b* of the bearings 11 and 12.

An electric capacity C is expressed as $C=\varepsilon\times S/d$, where d is a distance between two conductors facing each other, S is a facing area of the conductors, and s is a permittivity of a material present between the conductors.

As described above, in the motor 1E of the first comparative example (FIG. 7), the annular portion 21 and the inner cylinder portion 22 of the ferrite bond magnet 20 are present between the coil end 55*a* of the coil 55 and the rotary shaft 10. That is, a large amount of portion having a high permittivity is present between the coil end 55*a* and the rotary shaft 10. Accordingly, the electric capacity between the coil end 55*a* and the rotary shaft 10 increases, and the potential of the rotary shaft 10 increases. Consequently, a potential difference between the inner rings 11*a* and 12*a* and the outer rings 11*b* and 12*b*, that is, a bearing voltage, occurs.

Patent Reference 1 discloses that a plurality of conductive layers elongated in the axial direction are arranged in the circumferential direction on the inner side of the coil end in the radial direction (see paragraph 0020 of Patent Reference 1). It is understood that in this case, when the conductive layers are electrically connected to the stator core, the potential of the shaft can be reduced by the shield effect. However, the manufacturing cost may increase due to an increase in number of parts. Further, falling of parts (i.e., conductive layers) may occur during operation, or efficiency may decrease due to eddy current occurring on the surfaces of the parts.

On the other hand, in the first embodiment, as illustrated in FIG. 1, the length L1 of the facing portion 25 (i.e., the annular portion 21 of the ferrite bond magnet 20 and the rare-earth bond magnet 30) of the rotor 2 in the axial direction is equal to or shorter than the length L2 of the stator core 50 in the axial direction (L1≤L2). In other words, the facing portion 25 of the rotor 2 does not project from the stator core 50 in the axial direction.

With this configuration, the coil end 55*a* of the stator 5 does not face the facing portion 25 of the rotor in the radial direction. As a result, a portion with a high permittivity located between the coil end 55*a* and the rotary shaft 10 in the radial direction is only the inner cylinder portion 22 of the ferrite bond magnet 20. The volume of the inner cylinder portion 22 is sufficiently smaller than that of the facing portion 25. In a case where the rotor 2 is configured so that the inner cylinder portion 22 does not project from the annular portion 21 in the axial direction, none of the inner cylinder portion 22 and the facing portion 25 faces the coil end 55*a*.

Since the portion having a high permittivity present between the coil end 55*a* and the rotary shaft 10 is small as above, the electric capacity between the coil end 55*a* and the rotary shaft 10 is reduced so that the potential of the rotary shaft 10 can be reduced.

Since the outer rings 11*b* and 12*b* are at the ground potential, when the potential of the rotary shaft 10 in contact with the inner rings 11*a* and 12*a* is reduced, a potential difference between the inner rings 11*a* and 12*a* and the outer rings 11*b* and 12*b* is reduced, so that occurrence of the electrolytic corrosion can be suppressed.

In other words, the advantage of suppressing occurrence of electrolytic corrosion of the bearings 11 and 12 is obtained by making the length L1 of the facing portion 25 of the rotor 2 equal to or shorter than the length L2 of the stator core 50.

Figure 8B:
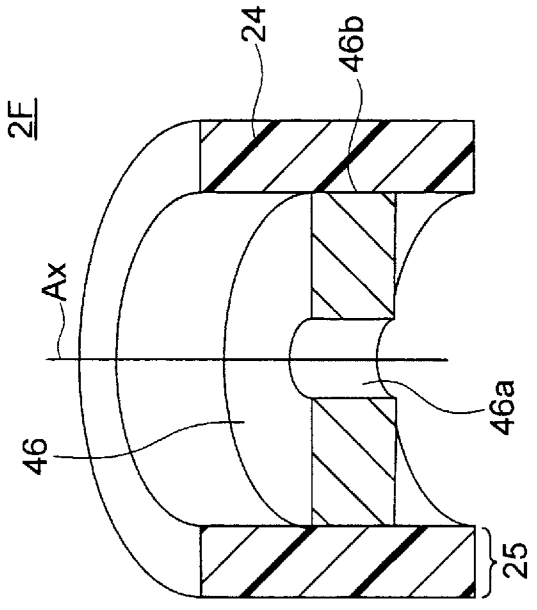
FIG. 8(B) is a partially cutaway perspective view illustrating a rotor of the second comparative example.
Figure 8A:
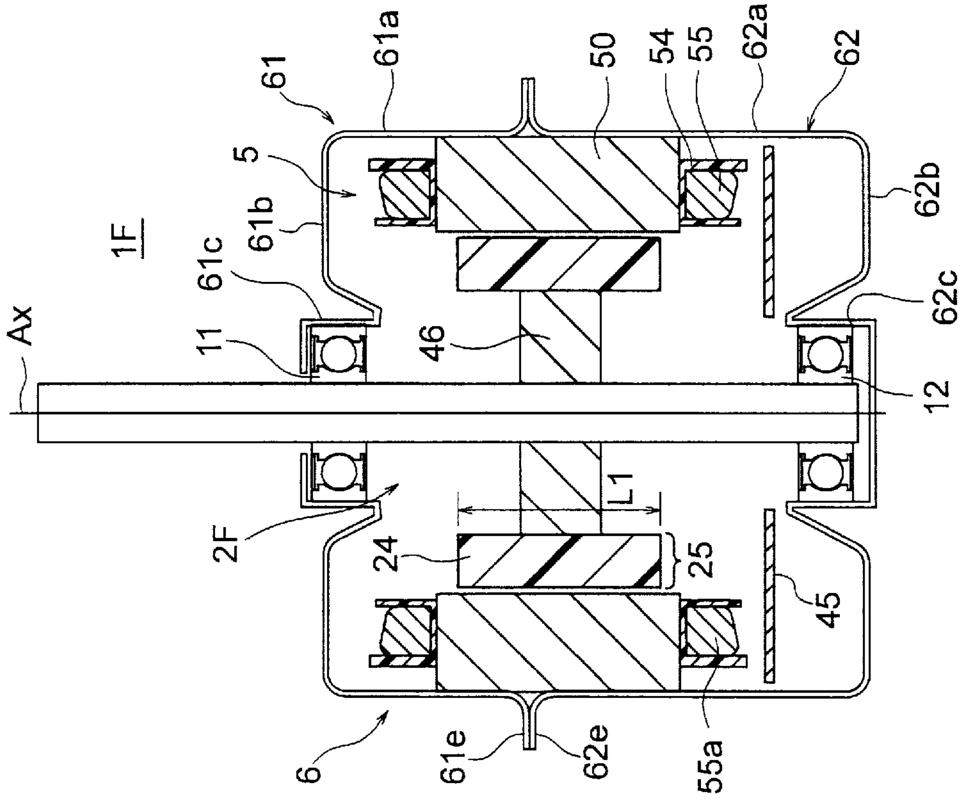
FIG. 8(A) is a longitudinal sectional view illustrating a motor of a second comparative example.

FIG. 8(A) is a longitudinal sectional view illustrating a motor 1F of a second comparative example. A rotor 2F of the motor 1F of the second comparative example includes an annular ferrite bond magnet 24, and a conductive support body 46 joining the rotary shaft 10 and the ferrite bond magnet 24.

That is, the ferrite bond magnet 24 of the second comparative example includes none of the inner cylinder portion 22 and the connecting portion 23, unlike the ferrite bond magnet 20 of the first embodiment. The ferrite bond magnet 24 constitutes a facing portion 25 as a whole. A length L1 of the facing portion 25 of the rotor 2F in the axial direction is equal to or shorter than a length L2 of a stator core 50 in the axial direction.

FIG. 8(B) is a perspective view illustrating the rotor 2F of the second comparative example. A conductive support body 46 is formed by stacking circular electromagnetic steel sheets in the axial direction. A rotary shaft 10 is fixed to an inner peripheral surface 46*a* of the conductive support body 46, and the ferrite bond magnet 24 is fixed to an outer peripheral surface 46*b* of the conductive support body 46.

In the second comparative example, the conductive support body 46 is interposed between the stator core 50 and the rotary shaft 10, and thus electric capacity between the stator core 50 and the rotary shaft 10 is large in a manner similar to a case where the distance between the stator core 50 and the rotary shaft 10 is small. Accordingly, in the motor 1F of the second comparative example, it is difficult to obtain the effect of reducing a bearing voltage.

Figure 9:
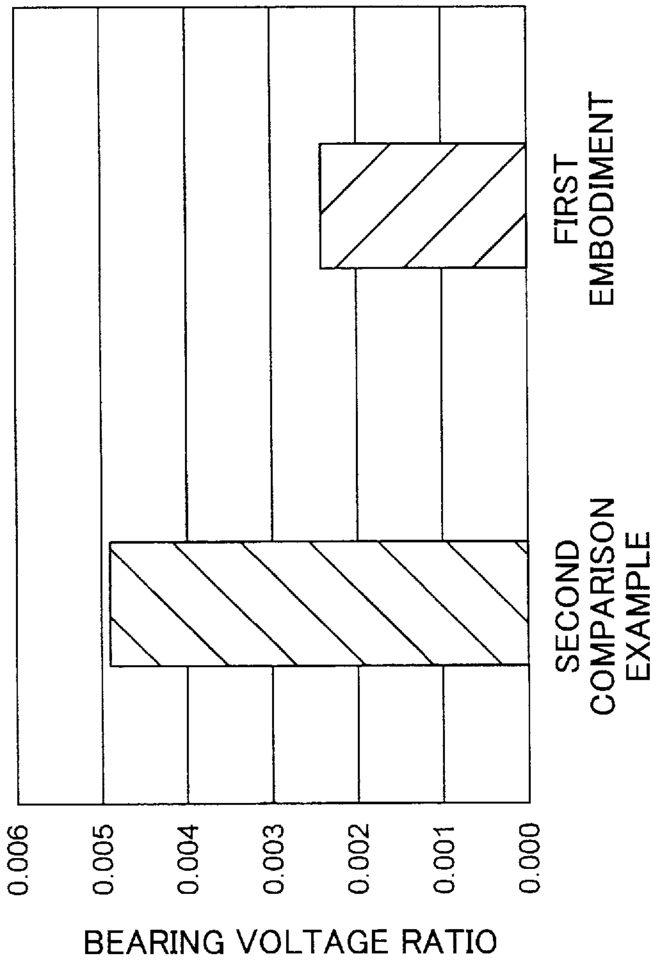
FIG. 9 is a graph showing a comparison of a bearing voltage ratio between the first embodiment and the second comparative example.

FIG. 9 is a graph showing a comparison of a bearing voltage ratio between the motor 1 of the first embodiment and the motor 1F of the second comparative example. The bearing voltage ratio on the vertical axis represents a ratio of a bearing voltage to a voltage applied to the coil 55.

The length L1 of the ferrite bond magnet 24 in the axial direction is set at 40 mm, which is equal to the length L2 of the stator core 50 in the axial direction. Since the inner rings

11*a* and 12*a* of the bearings 11 and 12 are electrically connected to each other via the shaft 10 and the outer rings 11*b* and 12*b* are electrically connected to each other via the housing 6, the values of the bearing voltage ratios of the bearings 11 and 12 are the same.

As shown in FIG. 9, in the motor 1F of the second comparative example, the effect of reducing the bearing voltage is smaller than that in the motor 1 of the first embodiment. This is because the conductive support body 46 is present between the stator 5 and the rotary shaft 10 as described above.

In the first embodiment, as illustrated in FIG. 1, the inner cylinder portion 22 and the connecting portion 23 of the ferrite bond magnet 20 are interposed between the facing portion 25 of the rotor 2 and the rotary shaft 10 and these portions are insulative. Thus, the effect of reducing the bearing voltage can be obtained.

Advantages of Embodiment

As described above, the motor 1 of the first embodiment includes the rotary shaft 10 supported by the bearings 11 and 12, the rotor 2 fixed to the rotary shaft 10, and the stator 5 including the stator core 50 surrounding the rotor 2 and the coil 55. The rotor 2 includes the facing portion 25 formed of the bond magnet and facing the stator core 50 in the radial direction, and the insulative joining portion (i.e., the inner cylinder portion 22 and the connecting portion 23) joining the facing portion 25 and the rotary shaft 10. The length L1 of the facing portion 25 in the axial direction is equal to or shorter than the length L2 of the stator core 50 in the axial direction.

With this configuration, the amount of portion with a high permittivity located between the coil end 55*a* and the rotary shaft 10 is reduced, so that electric capacity between the coil end 55*a* and the rotary shaft 10 can be reduced and the potential of the rotary shaft 10 can be reduced. Consequently, the bearing voltage can be reduced and occurrence of electrolytic corrosion can be suppressed, so that vibration and noise of the motor 1 can be reduced.

In addition, since the facing portion 25 of the rotor 2 includes the annular portion 21 of the ferrite bond magnet 20 and the rare-earth bond magnet 30, even when the length L1 of the facing portion 25 is reduced, high magnetic force can be generated. Further, since the rare-earth bond magnet 30 covers the annular portion 21 of the ferrite bond magnet 20 from outside in the radial direction, especially high magnetic force can be generated.

Moreover, since the inner cylinder portion 22 and the connecting portion 23 of the ferrite bond magnet 20 are interposed between the facing portion 25 of the rotor 2 and the rotary shaft 10, electric capacity between the stator core 50 and the rotary shaft 10 can be reduced as compared to the case where a conductor is interposed between the facing portion 25 of the rotor 2 and the rotary shaft 10 (FIGS. 8(A) and 8(B)). As a result, the bearing voltage can be further reduced, and occurrence of electrolytic corrosion can be effectively suppressed.

In addition, since the ferrite bond magnet 20 and the rare-earth bond magnet 30 are integrally molded with the rotary shaft 10, the ferrite bond magnet 20, the rare-earth bond magnet 30, and the rotary shaft 10 can be firmly integrated, and manufacturing cost can be reduced.

Although the rotor 2 of the first embodiment is constituted by the ferrite bond magnet and the rare-earth bond magnet, the present disclosure is not limited to such a combination, and it is sufficient that the rotor 2 is constituted by two types of bond magnets.

First Variation

Figure 10:
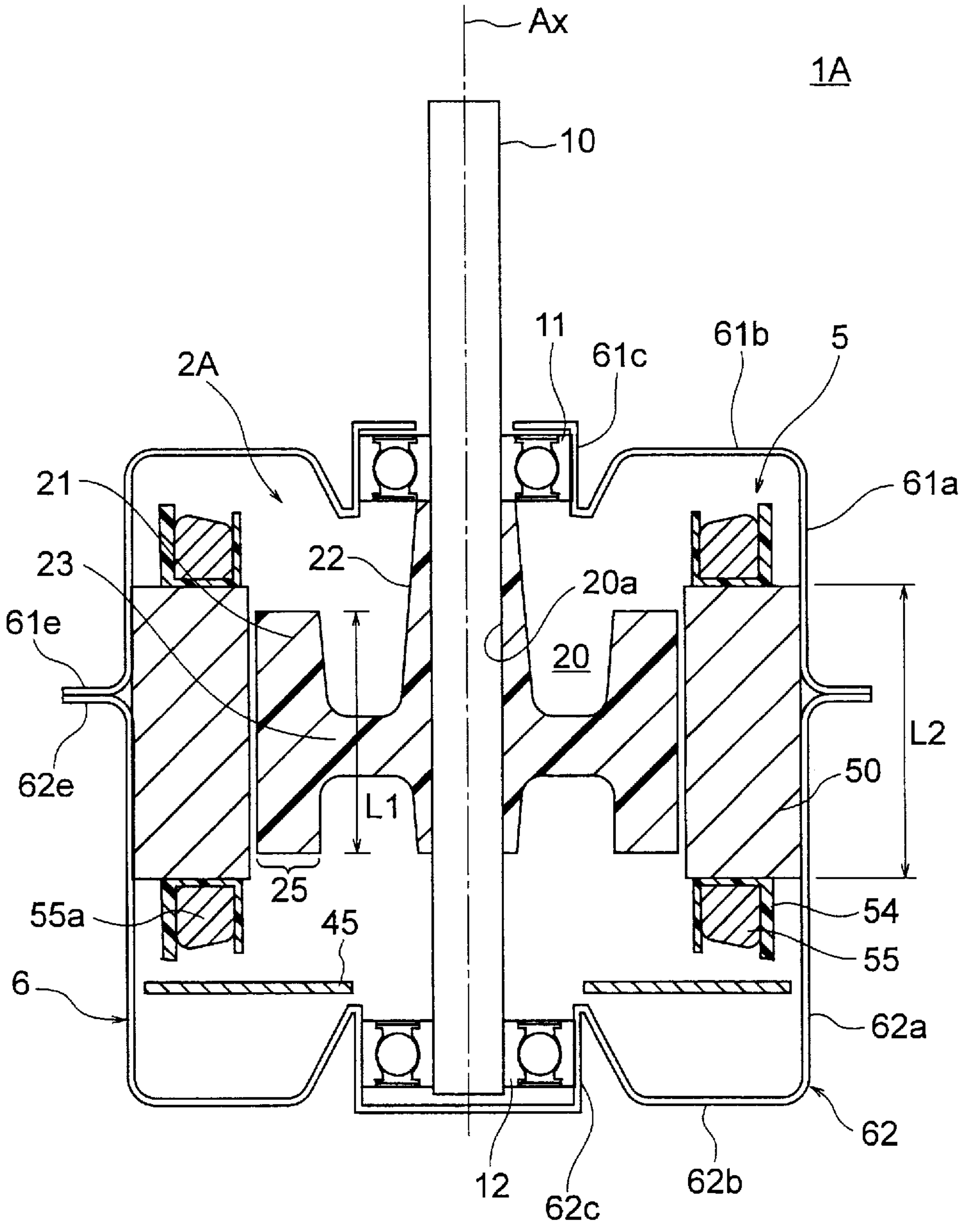
FIG. 10 is a longitudinal sectional view illustrating a motor of a first variation.
Figure 11:
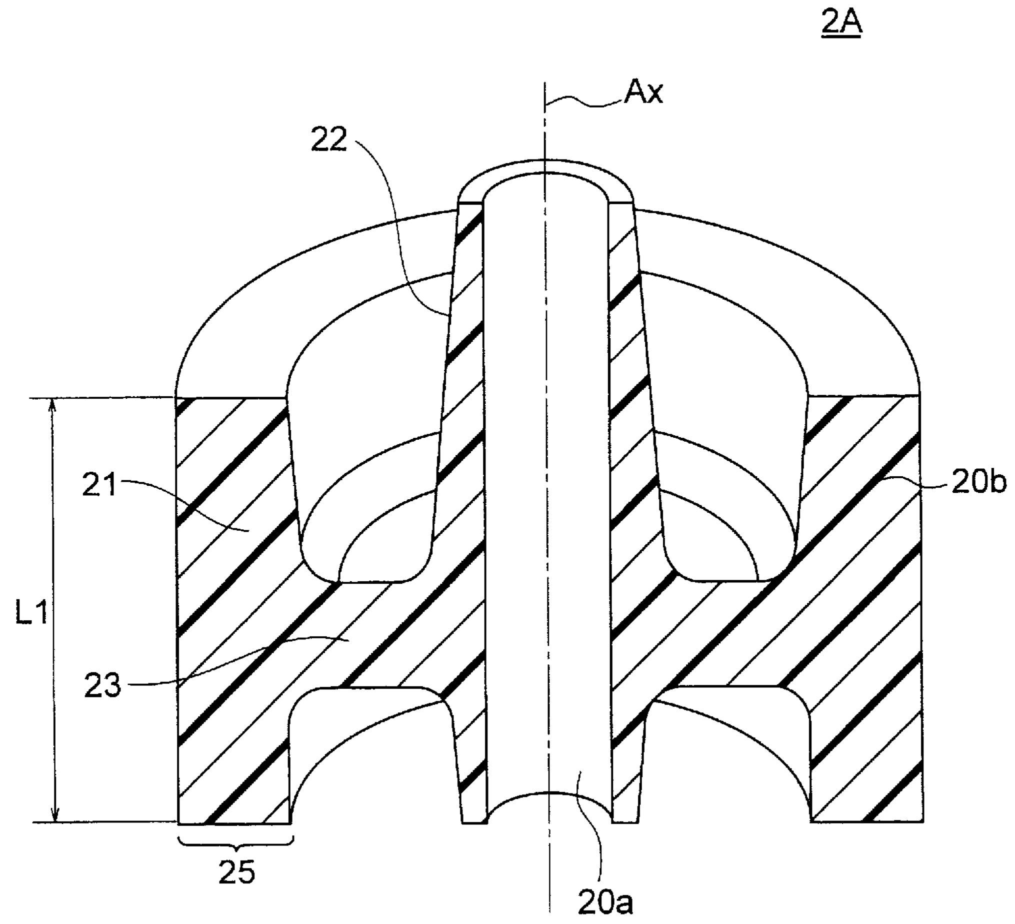
FIG. 11 is a partially cutaway perspective view illustrating a rotor of the first variation.

FIG. 10 is a longitudinal sectional view illustrating a motor 1A of a first variation. FIG. 11 is a perspective view illustrating a rotor 2A of the motor 1A of the first variation. As illustrated in FIGS. 10 and 11, in the motor 1A of the first variation, the rotor 2A is constituted by a ferrite bond magnet 20 and does not include a rare-earth bond magnet 30.

In a manner similar to the first embodiment, the ferrite bond magnet 20 includes an annular portion 21, an inner cylinder portion 22, and a connecting portion 23. The annular portion 21 of the ferrite bond magnet 20 constitutes a facing portion 25. A length L1 of the facing portion 25 in the axial direction is equal to or shorter than a length L2 of a stator core 50 in the axial direction (L1≤L2). The facing portion 25 does not project from the stator core 50 in the axial direction.

The ferrite bond magnet 20 is integrally molded with a rotary shaft 10 by insertion molding using an injection molding machine. With application of a polar anisotropic magnetic field during molding, the ferrite bond magnet 20 is oriented to have magnetic poles shown in FIG. 3.

In general, a ferrite bond magnet has a magnetic force lower than that of a rare-earth bond magnet. Thus, a magnetic force of the rotor 2A of the first variation including no rare-earth bond magnet is lower than the magnetic force of the rotor 2 of the first embodiment including the rare-earth bond magnet.

In the rare-earth bond magnet, conductive magnetic powder is surrounded by a resin. In the ferrite bond magnet, insulative magnetic powder is surrounded by a resin. That is, conductivity of the ferrite bond magnet as a whole is lower than conductivity of the rare-earth bond magnet as a whole. Accordingly, electric capacity between the coil end 55*a* and the rotary shaft 10 in the first variation is smaller than that in the first embodiment.

Figure 12:
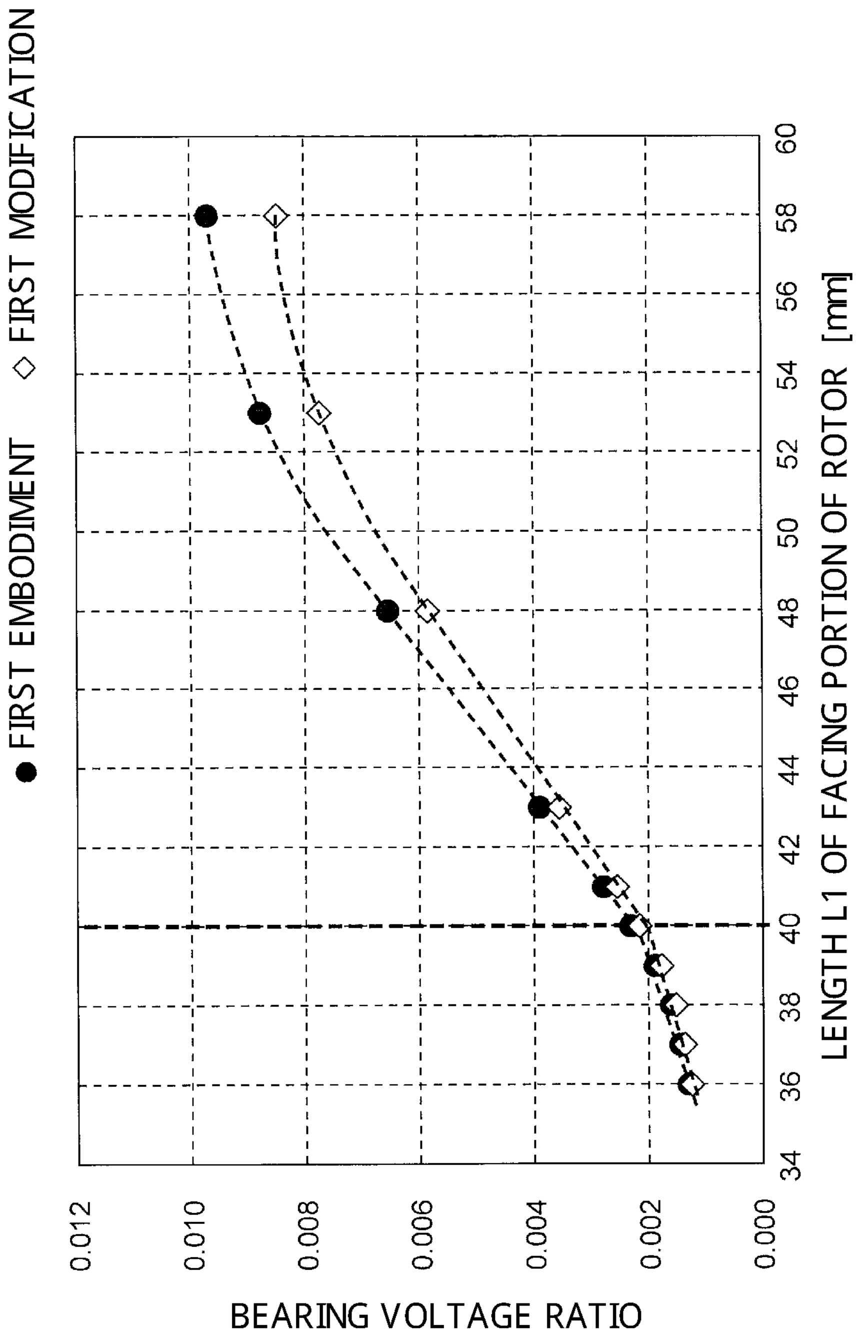
FIG. 12 is a graph showing a relationship between a bearing voltage ratio and lengths of facing portions of the rotors in the first embodiment and the first variation.

FIG. 12 is a graph showing a relationship between the length L1 of the facing portion 25 of each of the rotors 2 and 2A of the first embodiment and the first variation and a bearing voltage ratio. The horizontal axis represents the length L1 of the facing portion 25. The bearing voltage ratio on the vertical axis represents a ratio of a bearing voltage to a voltage applied to the coil 55. As described above, the bearing voltage ratios of the bearings 11 and 12 are the same.

Here, the length L2 of the stator core 50 in the axial direction is fixed to 40 mm, and the length L1 of the facing portion 25 of each of the rotors 2 and 2A in the axial direction is varied from 36 mm to 58 mm.

As illustrated in FIG. 12, in each of the first embodiment and the first variation, as the length L1 of the facing portion 25 of the rotor 2, 2A increases, the bearing voltage increases. In a region where the length L1 of the facing portion 25 is longer than the length L2 of the stator core 50, that is, a region where L1>L2 is satisfied, the bearing voltage of the first embodiment is higher than the bearing voltage of the first variation.

On the other hand, in a region where the length L1 of the facing portion 25 is equal to or shorter than the length L2 of the stator core 50, that is, a region where L1≤L2 is satisfied, there is no difference in bearing voltages between the first embodiment and the first variation, and the bearing voltage is low in each of the first embodiment and the first variation.

From this result, in each of the motor 1 of the first embodiment and the motor 1A of the first variation, by setting the length L1 of the facing portion 25 equal to or shorter than the length L2 of the stator core 50, the bearing voltage is reduced and occurrence of the electrolytic corrosion can be suppressed.

Although the rotor 2 of the first embodiment is constituted by the ferrite bond magnet 20 and the rare-earth bond magnet 30, and the rotor 2A of the first variation is constituted by the ferrite bond magnet 20, the rotor may be constituted only by the rare-earth bond magnet or only by another type of bond magnet. In this regard, if the rotor is constituted only by a rare-earth bond magnet, the bearing voltage tends to be excessively high, and thus the rotor preferably includes a ferrite bond magnet.

Second Variation

Figure 13:
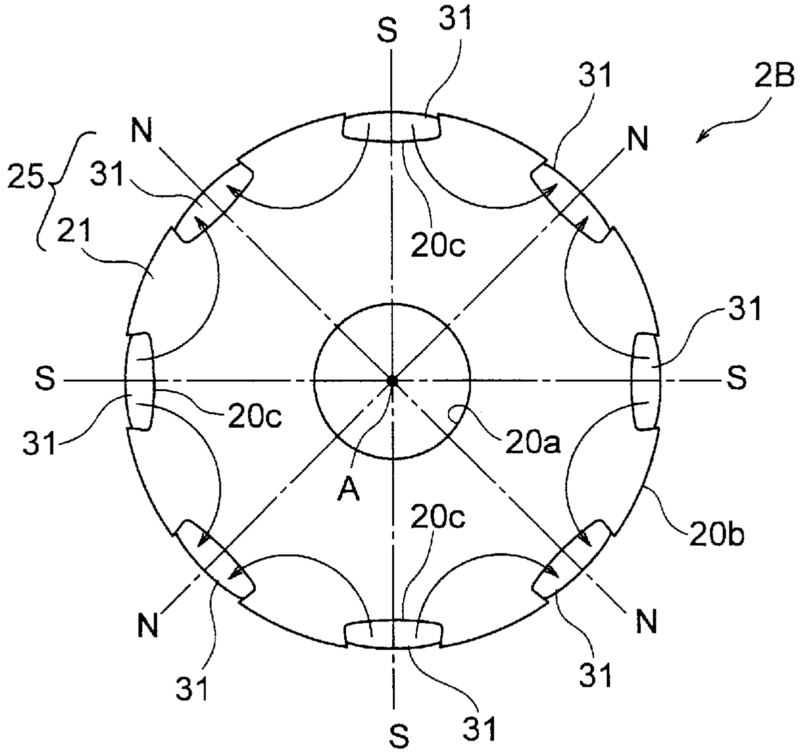
FIG. 13 is a view illustrating a rotor of a second variation.

FIG. 13 is a transverse sectional view illustrating a rotor 2B of a second variation. In the rotor 2 of the first embodiment, the annular rare-earth bond magnet 30 covers the outer peripheral surface 20*b* of the ferrite bond magnet 20. On the other hand, in the rotor 2B of the second variation, a plurality of rare-earth bond magnets 31 are arranged along the outer peripheral surface 20*b* of the ferrite bond magnet 20.

The rare-earth bond magnets 31 are arranged at equal intervals in the circumferential direction. The number of the rare-earth bond magnets 31 is equal to the number of poles of the rotor 2B. Each two of the rare-earth bond magnets 31 adjacent to each other in the circumferential direction are magnetized to have opposite polarities.

A plurality of recesses 20*c* in which the rare-earth bond magnets 31 are to be disposed are formed on the outer peripheral surface 20*b* of the ferrite bond magnet 20, that is, the outer peripheral surface of the annular portion 21 (FIG. 4). The annular portion 21 of the ferrite bond magnet 20 and the rare-earth bond magnets 31 form the facing portion 25.

Since the rotor 2B of the second variation includes the ferrite bond magnet 20 and the rare-earth bond magnets 31, even when the length L1 of the facing portion 25 of the rotor 2B in the axial direction is short, a high magnetic force can be generated, in a manner similar to the first embodiment.

Second Embodiment

Figure 14:
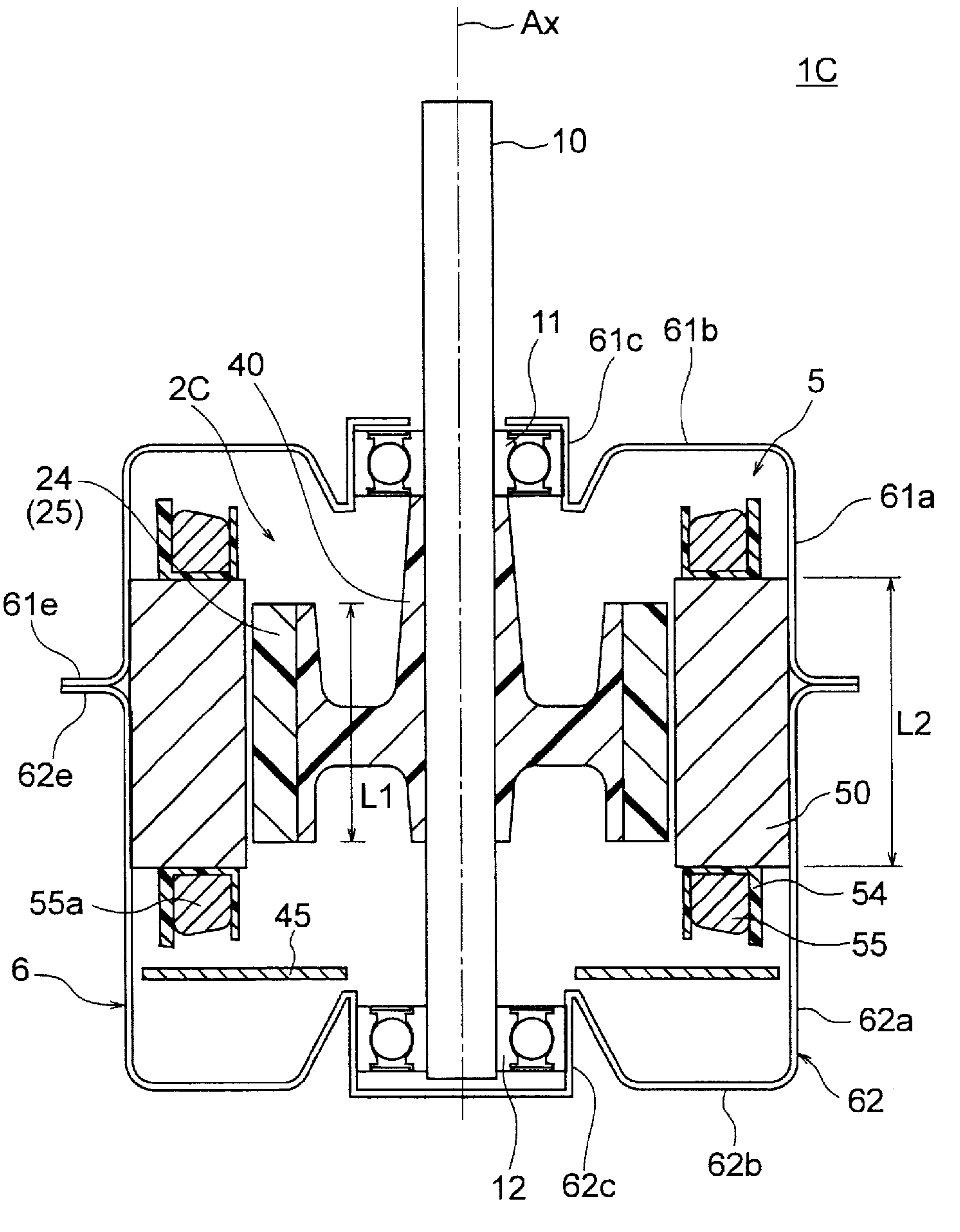
FIG. 14 is a longitudinal sectional view illustrating a motor of a second embodiment.

Next, a second embodiment will be described. FIG. 14 is a longitudinal sectional view illustrating a motor 1C according to the second embodiment. The rotor 2C of the second embodiment includes an annular ferrite bond magnet 24, and a resin part 40 as a joining portion joining a rotary shaft 10 and the ferrite bond magnet 24.

That is, the ferrite bond magnet 24 of the second embodiment includes none of the inner cylinder portion 22 and the connecting portion 23, unlike the ferrite bond magnet 20 of the first embodiment. The ferrite bond magnet 24 constitutes a facing portion 25 as a whole. A length L1 of the facing portion 25 of the rotor 2C in the axial direction is equal to or shorter than a length L2 of a stator core 50 in the axial direction.

Figure 15:
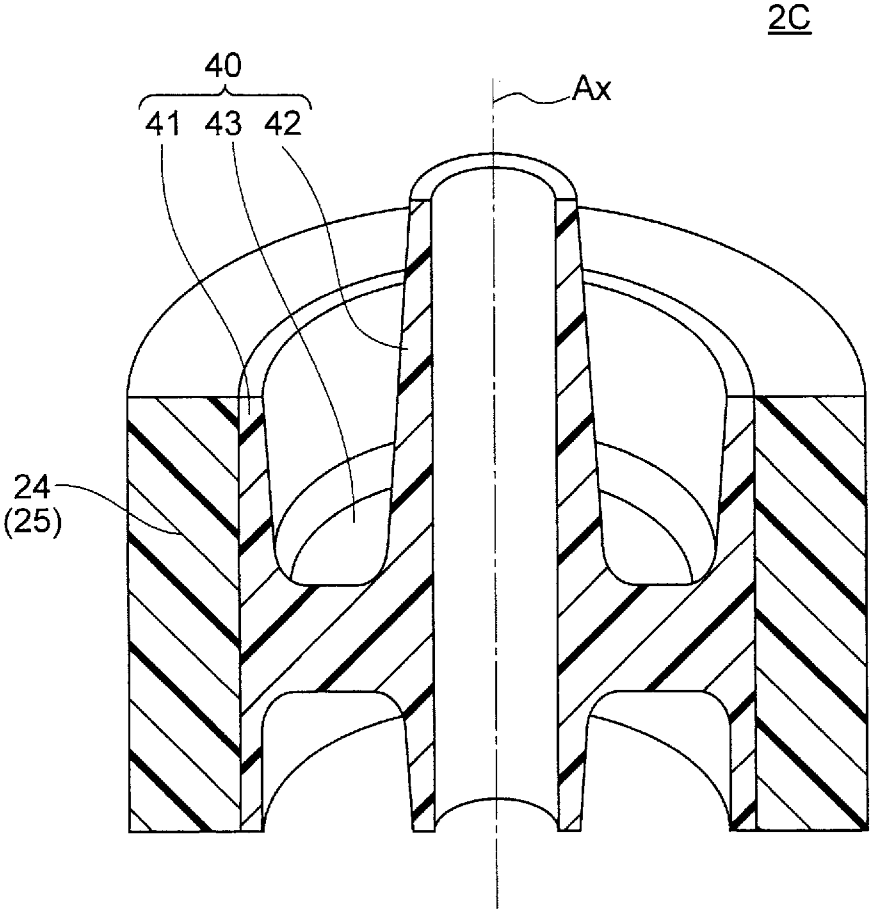
FIG. 15 is a partially cutaway perspective view of a rotor of the second embodiment.

FIG. 15 is a perspective view illustrating the rotor 2C. The resin part 40 includes an inner cylinder portion 42 fixed to the rotary shaft 10 (FIG. 14), an annular portion 41 surrounding the inner cylinder portion 42 from outside in the radial direction, and a connecting portion 43 connecting the annular portion 41 and the inner cylinder portion 42. The ferrite bond magnet 24 is fixed to the annular portion 41.

The resin part 40 is formed of a resin such as PBT, polyamide (nylon), or liquid crystal polymer (LCP), and is insulative. The relative permittivity of the resin constituting the resin part 40 is approximately 4, which is sufficiently lower than a relative permittivity of the ferrite bond magnet 24.

Since the ferrite bond magnet 24 is fixed to the rotary shaft 10 via the resin part 40 whose permittivity is low, electric capacity between a coil end 55*a* and the rotary shaft 10 can be reduced. As a result, bearing voltages at bearings 11 and 12 decrease, and occurrence of electrolytic corrosion can be thereby suppressed.

Figure 16:
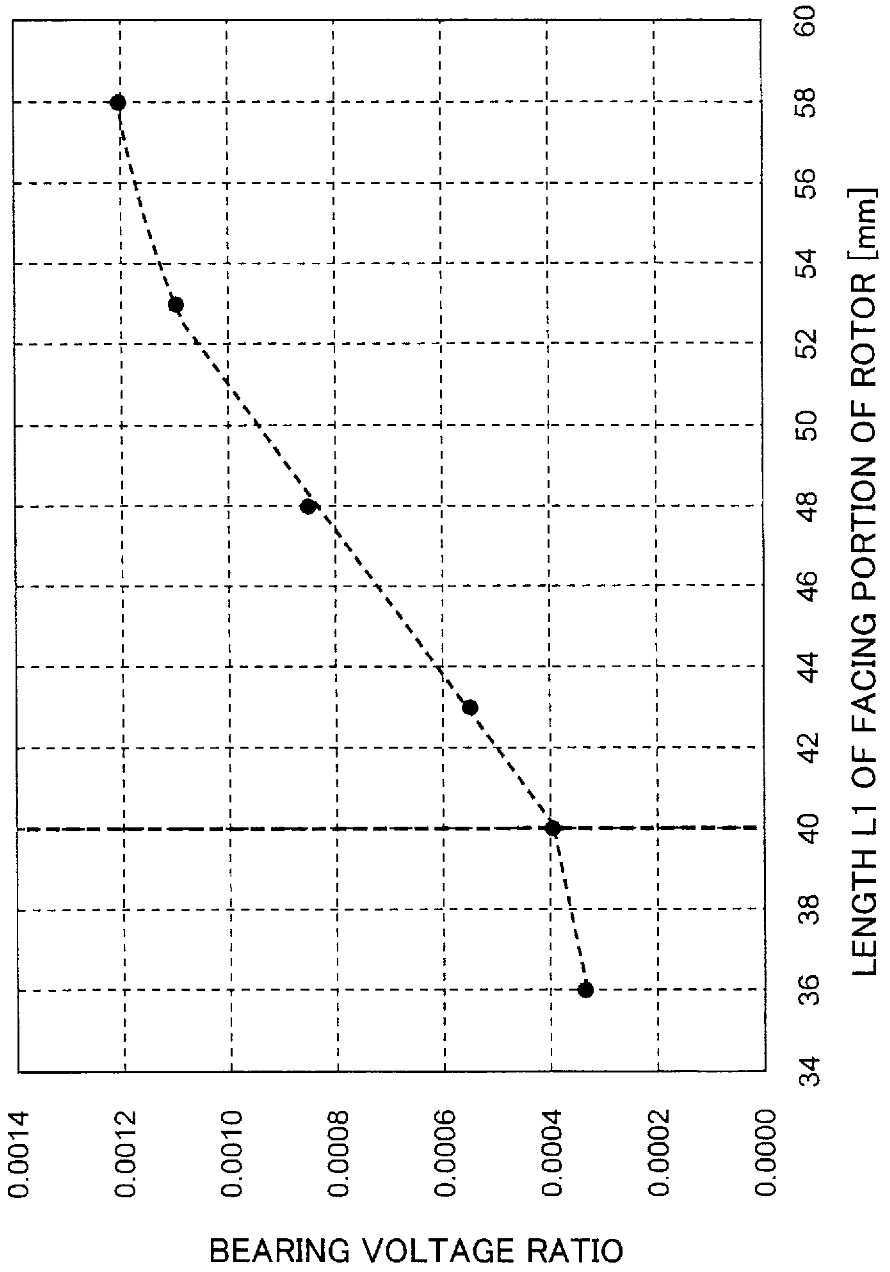
FIG. 16 is a graph showing a relationship between a length of a facing portion of the rotor in the second embodiment and a bearing voltage ratio.

FIG. 16 is a graph showing a relationship between the length L1 of the ferrite bond magnet 24 of the rotor 2C of the second embodiment in the axial direction and the bearing voltage ratio, obtained by electric field analysis. The horizontal axis represents the length L1 of the facing portion 25. The bearing voltage ratio on the vertical axis represents a ratio of the bearing voltage to a voltage applied to the coil 55. As described above, the bearing voltage ratios of the bearings 11 and 12 are the same.

FIG. 16 shows that the bearing voltage is low especially when the length L1 of the ferrite bond magnet 24 is equal to or shorter than the length L2 of the stator core 50 (L1≤L2). A comparison between FIG. 12 and FIG. 16 shows that the bearing voltage of the second embodiment is lower than that of the first embodiment. This is because the resin part 40 with a low permittivity is interposed between the ferrite bond magnet 24 and the shaft 10.

A rare-earth bond magnet 30 may be provided at the outer periphery of the ferrite bond magnet 24. The provision of the rare-earth bond magnet 30 can increase a magnetic force of the rotor 2C.

Except for the aspects described above, the motor 1C of the second embodiment has a configuration similar to that of the motor 1 of the first embodiment.

As described above, in the motor 1C of the second embodiment, since the ferrite bond magnet 24 is joined to the rotary shaft 10 via the resin part 40 whose permittivity is lower than that of the ferrite bond magnet 24, electric capacity between the coil end 55*a* and the rotary shaft 10 can be reduced. As a result, bearing voltages of the bearings 11 and 12 can be reduced, and occurrence of electrolytic corrosion can be suppressed.

Third Embodiment

Figure 17:
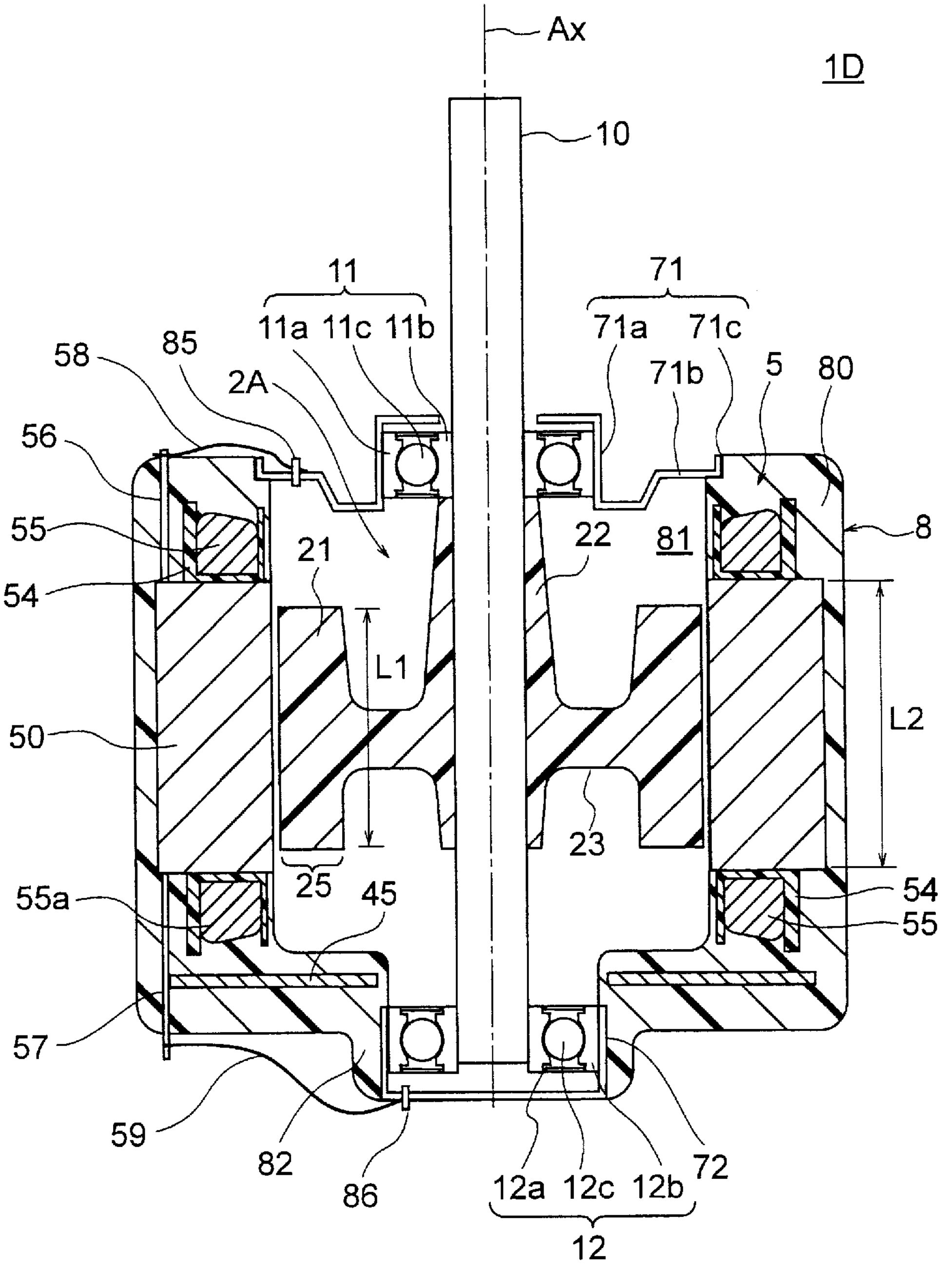
FIG. 17 is a longitudinal sectional view illustrating a motor of a third embodiment.

Next, a third embodiment will be described. FIG. 17 is a longitudinal sectional view illustrating a motor 1D according to the third embodiment. Although the stator 5 is held by the metal housing 6 in the motor 1 of the first embodiment, the stator 5 is held by a mold resin part 80 in the motor 1D of the third embodiment.

The mold resin part 80 as a resin part is formed of a bulk molding compound (BMC) containing unsaturated polyester. The mold resin part 80 covers the stator 5 from outside in the radial direction and from the counter-load side.

The mold resin part 80 has an opening portion 81 on the load side and a bearing holding portion 82 on the counter-load side. The rotor 2A is inserted in the stator 5 through the opening portion 81. The stator 5 and the mold resin part 80 constitute a mold stator 8.

The bearing 11 on the load side is held by a metal bracket 71 attached to the opening portion 81 of the mold resin part 80. The bracket 71 includes a cylindrical portion 71*a* supporting the bearing 11, a plate-shaped portion 71*b* extending outward in the radial direction from the cylindrical portion 71*a*, and a fitting portion 71*c* fitted onto a step portion around the opening portion 81. The cylindrical portion 71*a* of the bracket 71 contacts an outer ring 11*b* of the bearing 11. The bracket 71 is also referred to as a conductive member or a first conductive member.

The bearing 12 on the counter-load side is held by a conductive cap 72. The cap 72 has a bottomed cylindrical shape, for example, and is covered by the bearing holding portion 82 of the mold resin part 80 from outside in the radial direction. The cap 72 contacts an outer ring 12*b* of the bearing 12. The cap 72 is also referred to as a conductive member or a second conductive member.

Although the housing 6 is grounded in the first embodiment, the mold resin part 80 is insulative and cannot be grounded in the third embodiment. Instead, in the third embodiment, the bracket 71 and the cap 72 are grounded.

More specifically, a conductive pin 85 provided on the bracket 71 and a conductive pin 56 provided on the load side of the stator core 50 are electrically connected to each other by a lead wire 58. A conductive pin 86 provided on the cap 72 and a conductive pin 57 provided on the counter-load side of the stator core 50 are electrically connected to each other by a lead wire 59.

A driving circuit such as an inverter is mounted on a circuit board 45, and is grounded at the outside of the motor 1D via not-shown lead wires. Accordingly, the outer ring 11*b* of the bearing 11 is grounded via the bracket 71, the lead wire 58, and the circuit board 45. The outer ring 12*b* of the bearing 12 is grounded via the cap 72, the lead wire 59, and the circuit board 45.

The motor 1D includes the rotor 2A described in the first variation. The length L1 of the annular portion 21 of the rotor 2A is equal to or shorter than the length L2 of the stator core 50. The rotor 2A may be replaced by the rotor 2 of the first embodiment, the rotor 2B of the second variation, or the rotor 2C of the second embodiment.

Except for the aspects described above, the motor 1D of the third embodiment has a configuration similar to that of the motor 1 of the first embodiment.

Figure 18:
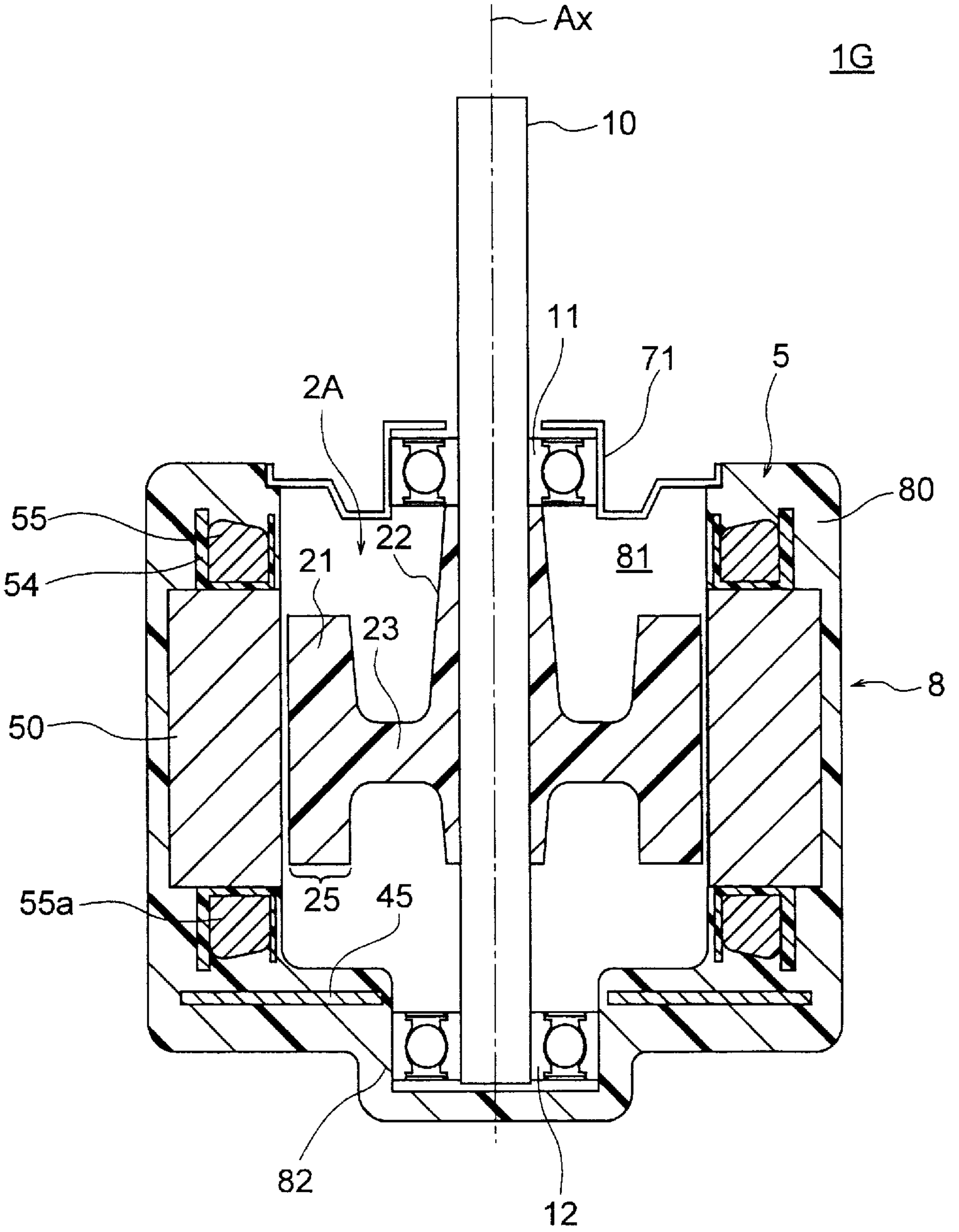
FIG. 18 is a longitudinal sectional view illustrating a motor of a third comparative example.

FIG. 18 is a longitudinal sectional view illustrating a motor 1G of a third comparative example. In the motor 1G of the third comparative example, the bearing 11 on the load side is held by the metal bracket 71, but the bracket 71 is not grounded. The motor 1G does not include the metal cap 72 holding the bearing 12 on the counter-load side. That is, none of the outer rings 11*b* and 12*b* of the bearings 11 and 12 is grounded.

In the bearing 12 on the counter-load side, the outer ring 12*b* is located close to the circuit board 45 and the circuit board 45 is grounded by a lead wire. Thus, a potential of the outer ring 12*b* is close to the ground potential. On the other hand, the inner ring 12*a* is in contact with the rotary shaft 10 and electric capacity is present between the rotary shaft 10 and the coil end 55*a*. Thus, a potential of the inner ring 12*a* tends to be higher than the ground potential. Accordingly, a potential difference between the inner ring 12*a* and the outer ring 12*b* tends to occur.

On the other hand, in the bearing 11 on the load side, the inner ring 11*a* is in contact with the rotary shaft 10, and electric capacity is present between the rotary shaft 10 and the coil end 55*a*. Thus, a potential of the inner ring 11*a* tends to be high. However, since the bearing 11 is separated from the circuit board 45 and a potential of the outer ring 11*b* is not the ground potential, a potential difference is less likely to occur between the inner ring 11*a* and the outer ring 11*b*.

Figure 19:
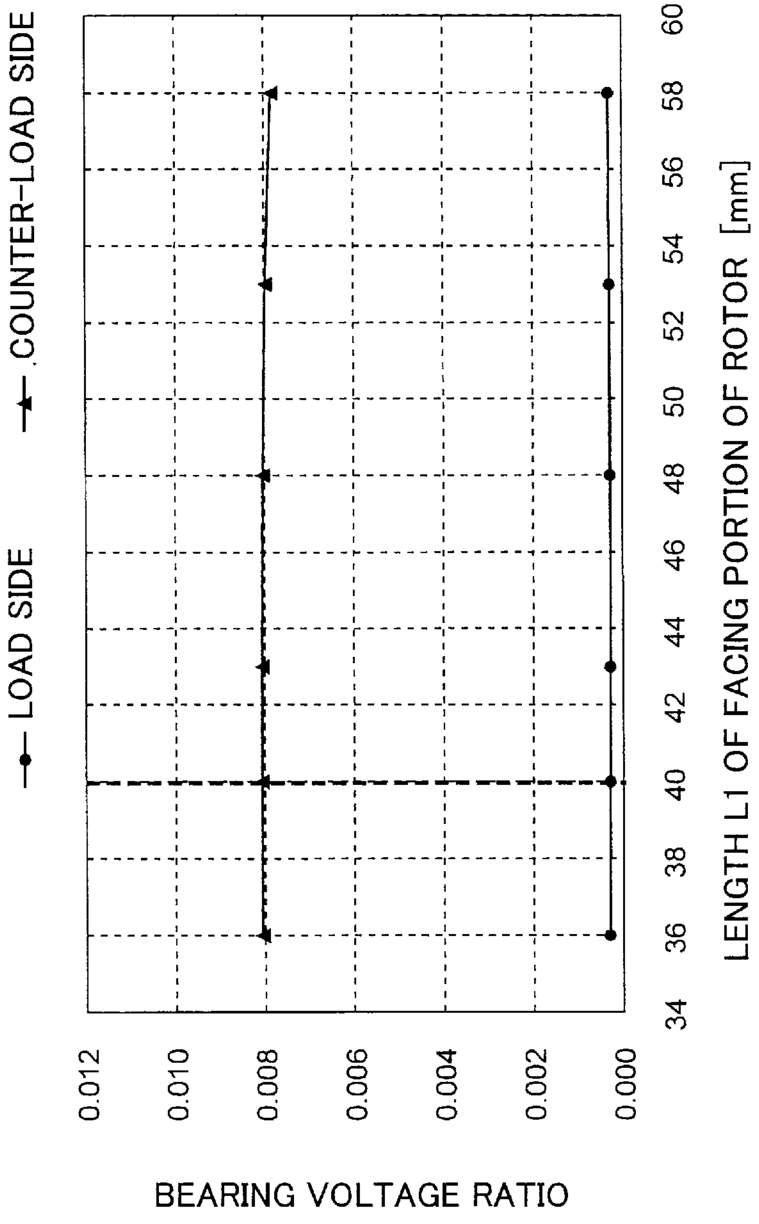
FIG. 19 is a graph showing a relationship between a length of a facing portion of the rotor in the third comparative example and a bearing voltage ratio.

FIG. 19 is a graph showing a relationship between a length L1 of the annular portion 21 and a bearing voltage of each of the bearings 11 and 12 of the rotor 2A in the motor 1G of the third comparative example. As shown in FIG. 19, the bearing voltage of the bearing 12 on the counter-load side is higher than the bearing voltage of the bearing 11 on the load side.

In FIG. 19, the bearing voltage of each of the bearings 11 and 12 is uniform independently of the length L1. This is because in the motor 1G of the third comparative example, since the outer rings 11*b* and 12*b* of the bearings 11 and 12 are not electrically connected to each other, the effect of reducing the bearing voltage by the relationship of $L1 \leq L2$ described above cannot be obtained.

On the other hand, in the third embodiment, as shown in FIG. 17, the outer ring 11*b* of the bearing 11 is grounded via the bracket 71 and the lead wire 58, and the outer ring 12*b* of the bearing 12 is grounded via the cap 72 and the lead wire 59. That is, the outer rings 11*b* and 12*b* of the bearings 11 and 12 are at the ground potential.

Thus, in a manner similar to the first embodiment in which the bearings 11 and 12 are held by the conductive housing 6, since the length L1 of the facing portion 25 of the rotor 2A in the axial direction is equal to or shorter than the length L2 of the stator core 50 in the axial direction, electric capacity between the coil end 55*a* and the rotary shaft 10 is reduced, and the bearing voltage of each of the bearings 11 and 12 can be reduced.

As described above, in the motor 1D of the third embodiment, the stator core 50 is held by the mold resin part 80, the outer ring 11*b* of the bearing 11 is grounded via the bracket 71 and the lead wire 58, the outer ring 12*b* of the bearing 12 is grounded via the cap 72 and the lead wire 59, and the length L1 of the annular portion 21 of the rotor 2A is equal to or shorter than the length L2 of the stator core 50. Accordingly, electric capacity between the coil end 55*a* and the rotary shaft 10 can be reduced, the bearing voltage of each of the bearings 11 and 12 can be reduced, and occurrence of electrolytic corrosion can be suppressed.

Fourth Embodiment

Figure 21:
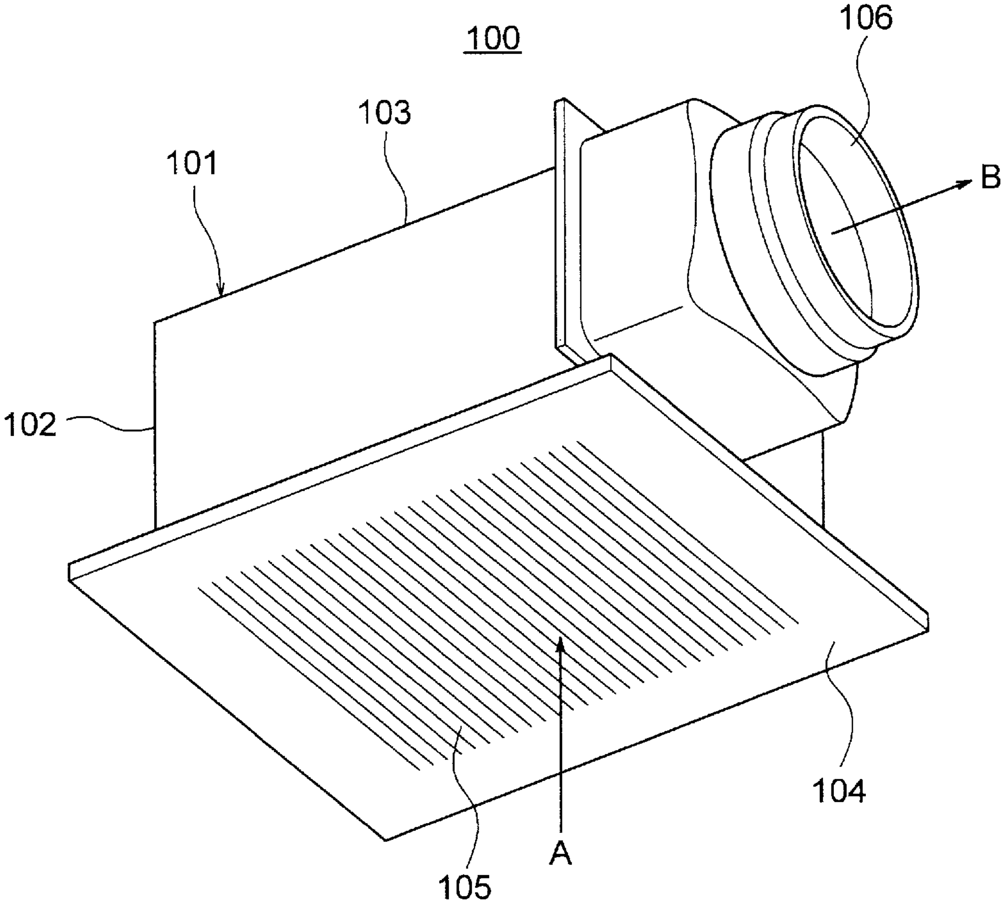
FIG. 21 is a perspective view illustrating the ventilation fan shown in FIG. 20.

Next, a fourth embodiment will be described. The fourth embodiment is directed to a fan 9 to which the motors of the embodiments and the variations described above are applicable, and a ventilation fan 100 including the fan 9. FIG. 20 is a sectional view illustrating the ventilation fan 100. FIG. 21 is a perspective view illustrating the ventilation fan 100. The ventilation fan 100 is disposed on an interior ceiling and used for exhausting indoor air to the outdoors through an exhaust duct. The ventilation fan 100 is also referred to as a duct ventilation fan.

The ventilation fan 100 includes the fan 9 and a casing 101 to which the fan 9 is mounted. The fan 9 includes the motor 1 described in the first embodiment, and an impeller 90 fixed to the rotary shaft 10 of the motor 1. The motor 1 described in the first embodiment may be replaced by the motor described in any one of the second and third embodiments and the variations.

The impeller 90 is also called a sirocco fan, and includes a plurality of blades 94 arranged in the circumferential direction between a main panel 92 and a side panel 93 facing each other in the axial direction. The main panel 92 is fixed to the rotary shaft 10. When the impeller 90 rotates, air flow directed outward in the radial direction from the center axis Ax is generated.

The casing 101 is a rectangular parallelepiped vessel formed of a steel sheet or a resin. The casing 101 includes a top panel 103 and a bottom panel 104 facing each other in the axial direction, and a side wall 102 between the top panel 103 and the bottom panel 104. The top panel 103 includes an opening portion 108 to which the motor 1 is mounted. The motor 1 is mounted to the opening portion 108 in such a manner that a side of the motor 1 near the first frame 61 is housed in the casing 101, and the flange portions 61*e* and 62*e* are fixed to the periphery of the opening portion 108.

An outer edge of the bottom panel 104 is fixed to the lower surface of a celling panel 200. The bottom panel 104 includes a grille 105 for sucking air from the room as indicated by arrow A.

A ventilation duct 106 for exhausting air to the outside of the casing 101 is attached to the side wall 102 of the casing 101. A not-shown exhaust duct connected to the outdoors is connected to the ventilation duct 106.

When the motor 1 is driven, the impeller 90 fixed to the rotary shaft 10 rotates. Accordingly, as indicated by arrow A, indoor air is sucked into the casing 101 through the grille 105. Air sucked in the casing 101 flows outward in the radial direction by the impeller 90, is exhausted from the casing 101 through the ventilation duct 106, and is exhausted to the outdoors through the exhaust duct.

Since the ventilation fan 100 is mounted on the interior ceiling, vibration and noise thereof are easily transmitted to the indoors. The use of the motor 1 of the first embodiment as a driving source of the ventilation fan 100 can reduce vibration and noise due to electrolytic corrosion of the bearings 11 and 12. Accordingly, vibration and noise transmitted to the indoors are reduced, and quietness is enhanced.

In addition, since occurrence of electrolytic corrosion of the bearings 11 and 12 is suppressed, the lifetime of the ventilation fan 100 can be prolonged, and reliability can be enhanced. The same holds for the case where the motor 1 of the first embodiment may be replaced by the motor of any one of the second and third embodiments and the variations.

Although this embodiment is directed to the ventilation fan using the sirocco fan, the type of the impeller is not limited to the sirocco fan, and a propeller fan or a crossflow fan, for example, may be employed.

The fan including the motor described in any one of the embodiments and the variations is not limited to the ventilation fan, and is also applicable to a range hood, a bathroom dryer, an electric fan, a dehumidifier, and an air conditioner, for example.

Although the preferred embodiments have been specifically described above, the present disclosure is not limited to the embodiments described above, and various improvements and modifications may be made.

What is claimed is:

1. A motor comprising:
a rotary shaft;
a rotor fixed to the rotary shaft;
a stator comprising a stator core surrounding the rotor in a radial direction about a center axis of the rotary shaft, and a coil wound on the stator core;
a bearing having an inner ring and an outer ring, the inner ring being in contact with the rotary shaft; and
a conducting member electrically connecting the stator core to the outer ring and being grounded,
wherein the rotor comprises:
a facing portion facing the stator core in the radial direction; and
an insulating joining portion joining the facing portion and the rotary shaft,
wherein the facing portion includes a first magnet portion formed of a ferrite bond magnet and a second magnet portion formed of a rare-earth bond magnet and provided on an outer periphery of the first magnet portion,
wherein a length L1 of the facing portion in an axial direction of the rotary shaft is equal to or shorter than a length L2 of the stator core in the axial direction.

2. The motor according to claim 1, wherein the second magnet portion covers the outer periphery of the first magnet portion.

3. The motor according to claim 1, wherein the second magnet portion is one of a plurality of second magnet portions arranged with intervals in a circumferential direction at the outer periphery of the first magnet portion.

4. The motor according to claim 1, wherein the insulating joining portion is formed of a bond magnet.

5. The motor according to claim 4, wherein the facing portion and the insulating joining portion are integrally molded with the rotary shaft.

6. The motor according to claim 1, wherein the conducting member is a metal housing that holds the stator and the bearing.

7. The motor according to claim 1, further comprising a resin part that holds the stator and the bearing,
wherein the conducting member includes a conductive member connecting the stator and the bearing.

8. A fan comprising:
the motor according to claim 1; and
an impeller fixed to the rotary shaft of the motor.

9. A ventilation fan comprising:
the fan according to claim 8; and
a casing to which the fan is mounted.

10. The motor according to claim 1, wherein the stator, the outer ring, and the conducting member are at a ground potential, and
wherein the rotary shaft and the inner ring are at a same potential which is higher than the ground potential.

11. A motor comprising:
a rotary shaft;
a rotor fixed to the rotary shaft;
a stator comprising a stator core surrounding the rotor in a radial direction about a center axis of the rotary shaft, and a coil wound on the stator core;
a bearing having an inner ring and an outer ring, the inner ring being in contact with the rotary shaft; and
a conducting member electrically connecting the stator core to the outer ring and being grounded,
wherein the rotor comprises:
a facing portion formed of a bond magnet and facing the stator core in the radial direction; and
an insulating joining portion joining the facing portion and the rotary shaft, and
wherein a length L1 of the facing portion in an axial direction of the rotary shaft is equal to or shorter than a length L2 of the stator core in the axial direction,
wherein the facing portion includes a first magnet portion formed of a ferrite bond magnet and a second magnet portion formed of a rare-earth bond magnet and provided on an outer periphery of the first magnet portion, and
wherein the insulating joining portion is formed of a material with a permittivity lower than that of the facing portion.

12. The motor according to claim 11, wherein the insulating joining portion is formed of a resin.

13. The motor according to claim 11, wherein the conducting member is a metal housing that holds the stator and the bearing.

14. The motor according to claim 11, further comprising a resin part that holds the stator and the bearing, wherein the conducting member includes a conductive member connecting the stator and the bearing.

15. A fan comprising:

the motor according to claim 11; and an impeller fixed to the rotary shaft of the motor.

16. A ventilation fan comprising:

the fan according to claim 15; and a casing to which the fan is mounted.

17. The motor according to claim 11, wherein the stator, the outer ring, and the conducting member are at a ground potential, and wherein the rotary shaft and the inner ring are at a same potential which is higher than the ground potential.

* * * * *